United States Patent
Kaneko et al.

(10) Patent No.: US 9,152,331 B2
(45) Date of Patent: Oct. 6, 2015

(54) COMPUTER SYSTEM, STORAGE MANAGEMENT COMPUTER, AND STORAGE MANAGEMENT METHOD

(71) Applicant: HITACHI, LTD., Tokyo (JP)

(72) Inventors: Satoshi Kaneko, Sagamihara (JP); Tsukasa Shibayama, Kawasaki (JP); Yukinori Sakashita, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/597,602

(22) Filed: Jan. 15, 2015

(65) Prior Publication Data

US 2015/0193161 A1     Jul. 9, 2015

Related U.S. Application Data

(63) Continuation of application No. 13/576,553, filed as application No. PCT/JP2012/061662 on May 7, 2012, now Pat. No. 8,966,206.

(51) Int. Cl.
*G06F 12/00* (2006.01)
*G06F 3/06* (2006.01)

(52) U.S. Cl.
CPC .......... *G06F 3/0619* (2013.01); *G06F 3/0631* (2013.01); *G06F 3/0665* (2013.01); *G06F 3/0689* (2013.01)

(58) Field of Classification Search
None
See application file for complete search history.

(56) References Cited

U.S. PATENT DOCUMENTS 7,043,661 B2     5/2006   Valadarsky et al.
(Continued)

FOREIGN PATENT DOCUMENTS

| JP | 2006-252247 A | 9/2006 |
|----|---------------|--------|
| JP | 2001-337790 A | 12/2001 |
| JP | 2003-216460 A | 7/2003 |

(Continued)

OTHER PUBLICATIONS

Kazuhiko Hoshiba, "The latest trend of the server virtualization software which supports a 256 core" larger server, Nikkei Systems, Oct. 26, 2011, No. 223, p. 104-105. ISSN1881-1620.

(Continued)

*Primary Examiner* — Midys Rojas
(74) *Attorney, Agent, or Firm* — Volpe and Koenig, P.C.

(57) ABSTRACT

A memory stores first configuration information indicating a plurality of logical storage areas and a first condition defining a state of a storage apparatus as a trigger for the storage apparatus to move data. A CPU acquires: a second condition defining a state of a computer as a trigger for the computer to move a first object, which is stored in a first logical storage area among the plurality of logical storage areas and performed by the computer, to another one of the plurality of logical storage areas; second configuration information associating the first object and the first logical storage area; first state information indicating a state of the plurality of logical storage areas; and second state information indicating a state of the first object. If a state of performing data movement is set, the CPU identifies a cause of the state of performing the data movement.

14 Claims, 19 Drawing Sheets

(56) References Cited

U.S. PATENT DOCUMENTS

| | | |
|---|---|---|
| 2001/0054133 A1 | 12/2001 | Murotani et al. |
| 2003/0140207 A1 | 7/2003 | Nagase et al. |
| 2006/0206675 A1 | 9/2006 | Sato et al. |
| 2007/0055713 A1 | 3/2007 | Nagai et al. |
| 2007/0118710 A1 | 5/2007 | Yamakawa et al. |
| 2009/0300285 A1 | 12/2009 | Nagai et al. |
| 2011/0258405 A1 | 10/2011 | Asaki et al. |
| 2011/0302305 A1 | 12/2011 | Morimura et al. |

FOREIGN PATENT DOCUMENTS

| | | |
|---|---|---|
| JP | 2007-066259 A | 3/2007 |
| JP | 2007-140919 A | 6/2007 |
| JP | 2010-086115 A | 4/2010 |
| JP | 2011-227563 A | 11/2011 |

OTHER PUBLICATIONS

Duncan Epping, "What's New in VMware vSphere 5.0-Storage", Technical Marketing Documentation, v1.0/Updated May 2011.

|       | 2691    | 2692  | 2693  | 2694            | 2695               |
|-------|---------|-------|-------|-----------------|--------------------|
|       | Rule ID | HV ID | VM ID | Time Interval(h)| VM Movement Rule   |
| 2690  | 001     | 001   | 001   | 8h              | Response time < 15ms |
|       | 002     | 001   | 002   | 4h              | Response time < 10ms |
|       | 003     | 001   | 003   | 24h             | Response time < 15ms |

Fig.8

|       | 2701  | 2702  | 2703                | 2704               |
|-------|-------|-------|---------------------|--------------------|
|       | HV ID | VM ID | Measurement Time    | Response Time (ms) |
| 2700  | 001   | 001   | 2011-10-10 08:00:00 | 10.0               |
|       |       |       | 2011-10-10 09:00:00 | 11.2               |
|       |       |       | 2011-10-10 10:00:00 | 11.8               |

Fig.9

|       | 2711       | 2712    | 2713                                            | 2714                                             |
|-------|------------|---------|-------------------------------------------------|--------------------------------------------------|
|       | Storage ID | Port ID | High Load Criteria Amount of Transferred Read Data (MB/s) | High Load Criteria Amount of Transferred Write Data (MB/s) |
| 2710  | 001        | 001     | 350                                             | 300                                              |
|       |            | 002     | 350                                             | 300                                              |
|       |            | 003     | 500                                             | 500                                              |

Fig.10

|       | 2721       | 2722    | 2723                | 2724                               | 2725                                |
|-------|------------|---------|---------------------|------------------------------------|-------------------------------------|
|       | Storage ID | Port ID | Measurement Time    | Amount of Transferred Read Data (MB/s) | Amount of Transferred Write Data (MB/s) |
| 2720  | 001        | 001     | 2011-10-10 08:00:00 | 200                                | 100                                 |
|       |            |         | 2011-10-10 09:00:00 | 200                                | 100                                 |
|       |            |         | 2011-10-10 10:00:00 | 300                                | 300                                 |

Fig.11

| | 2731 | 2732 | 2733 | 2734 |
|---|---|---|---|---|
| | Storage ID | Resource Type | Read rate (MB/s) | Write rate (MB/s) |
| 2730 | 001 | SATA | 250 | 70 |
| | | SAS | 600 | 500 |
| | | SSD | 1000 | 1000 |

Fig.12

| | 2741 | 2742 | 2743 | 2744 |
|---|---|---|---|---|
| | Connection Apparatus ID | Port ID | High Load Criteria Amount of Transferred Read Data (MB/s) | High Load Criteria Amount of Transferred Write Data (MB/s) |
| 2740 | 001 | 001 | 350 | 300 |
| | | 002 | 350 | 300 |
| | | 003 | 500 | 500 |

Fig.13

| 2751 | 2752 | 2753 | 2754 | 2755 |
|---|---|---|---|---|
| Connection Apparatus ID | Port ID | Measurement Time | Amount of Transferred Read Data (MB/s) | Amount of Transferred Write Data (MB/s) |
| 001 | 001 | 2011-10-10 08:00:00 | 200 | 100 |
| | | 2011-10-10 09:00:00 | 200 | 100 |
| | | 2011-10-10 10:00:00 | 300 | 300 |

|  | 2761 | 2762 | 2763 | 2764 | 2765 |
|---|---|---|---|---|---|
|  | HV ID | VM ID | Connection Apparatus ID | Connection Apparatus Initiator Port ID | Connection Apparatus Target Port ID |
| 2760A | 001 | 001 | 001 | 001 | 004 |
|  |  | 002 | 001 | 002 | 005 |
|  |  | 003 | 001 | 003 | 006 |
|  | 002 | null | 002 | 001 | 002 |

Fig.15

|  | 2767 | 2768 | 2769 | 2770 |
|---|---|---|---|---|
|  | Storage ID | Storage Port ID | Logical Volume ID | LBA |
| 2760B | 001 | 001 | 001 | 0 – 1500, 3000 - 6000 |
|  | 001 | 002 | 002 | 3000 – 4500, 11000 – 12000 |
|  | 001 | 002 | 002 | 5000 – 5500, 20000 – 26000 |
|  | 001 | 001 | 003 | null |

Fig.16

| | 2781 | 2782 | 2783 | 2784 |
|---|---|---|---|---|
| | Rule ID | Priority | Time Interval | Page Movement Rule |
| 2780 | 001 | 2 | 8h | Move to SATA if IOPS < 700 |
| | | | | Move to SAS if 700 ≤ IOPS ≤ 900 |
| | | | | Move to SSD if IOPS > 900 |
| | 002 | 1 | 12h | Move to SSD if VM ID = 3   2785 |

Fig.17

| | 2791 | 2792 | 2793 | 2794 | 2795 |
|---|---|---|---|---|---|
| | Storage ID | Logical Volume ID | Page ID | IOPS | Rule ID |
| 2790 | 001 | 001 | 001 | 650 | 1 |
| | | | 002 | 550 | 1 |
| | | | 003 | 750 | 1 |

Fig.18

|  | 2801 | 2802 | 2803 | 2804 | 2805 | 2806 |
|---|---|---|---|---|---|---|
|  | Logical Volume ID | Page ID | LBA | Pool ID | Resource ID | LBA |
|  | 0 | 1 | 0 - 999 | 1 | 0 | 1000 - 1999 |
|  |  | 2 | 1000 - 1999 |  | 1 | 0 - 999 |
|  |  | 3 | 2000 - 2999 |  | 2 | 0 - 999 |
|  |  | 4 | 3000 - 3999 |  | 2 | 1000 - 2999 |
|  |  | null | 4000 - 199999 |  | null | null |
|  | ... | ... | ... | ... | ... | ... |

2800

| Storage ID | Pool ID | Resource ID | Resource Type | Resource Configuration |
|---|---|---|---|---|
| Storage1 | 0 | 0 | FC | Inside |
| | 1 | 1 | FC | Inside |
| | | 2 | SSD | Inside |
| | | 3 | FC | Outside |
| | 2 | 4 | SATA | Outside |
| ... | ... | ... | ... | ... |

| Storage ID | Resource ID | Port ID | External Storage ID | External Storage Resource ID | External Storage Port ID |
|---|---|---|---|---|---|
| Storage1 | 3 | 0 | Storage2 | 0 | 1 |
| | 4 | 1 | Storage2 | 1 | 2 |
| ... | ... | ... | ... | ... | ... |

| Rule ID (2691) | HVID (2692) | VM ID (2693) | Movement Interval (h) (2694) | VM Movement Rule (2695B) |
|---|---|---|---|---|
| 001 | 001 | 001 | 8h | Capacity Utilization Rate < 80 % |
| 002 | 001 | 002 | 4h | Capacity Utilization Rate < 70 % |
| 003 | 001 | 003 | 24h | Capacity Utilization Rate < 80 % |

| HV ID (2701) | VM ID (2702) | HV Storage Area ID (2706) | Measurement Time (2703) | Response Time (ms) (2704) | Capacity Utilization Rate (%) (2707) |
|---|---|---|---|---|---|
| 001 | 001 | 001 | 2011-10-10 08:00:00 | 10.0 | 50 |
| | | | 2011-10-10 09:00:00 | 11.2 | 50 |
| | | | 2011-10-10 10:00:00 | 11.8 | 55 |

Fig.29

| Storage ID | Storage Port ID | Logical Volume ID | HV Storage Area ID | LBA |
|---|---|---|---|---|
| 001 | 001 | 001 | 001 | 0 – 1500, 3000 – 6000 |
| 001 | 002 | 002 | 005 | 3000 – 4500, 11000 – 12000 |
| 001 | 002 | 002 | 005 | 5000 – 5500, 20000 – 26000 |
| 001 | 001 | 003 | 010 | null |

2760D

COMPUTER SYSTEM, STORAGE MANAGEMENT COMPUTER, AND STORAGE MANAGEMENT METHOD

TECHNICAL FIELD

The present invention relates to a computer system including a storage apparatus, and particularly, to a technique of controlling movement of data in a virtualized server environment.

BACKGROUND ART

Hierarchical storage management (HSM) is known as a technique of effectively utilizing a storage resource in a computer system. In relation to this, there is a known technique in which a storage system arranges data in an appropriate storage hierarchy based on the status of access to data (for example, Patent Literature 1).

Meanwhile, the performance of a host computer is improved, and for example, a plurality of virtual host computers (Virtual Machine: hereinafter, called "VM") can be operated on a physical host computer. In relation to this, there is a technique (Storage DRS: Distributed Resource Scheduler) of moving the VM stored in a storage area to another storage area according to information indicating the performance of the VM or according to usage information of resources (for example, Non Patent Literature 1). The VM is a type of data stored in a storage area, and the VM movement is a type of data movement between storage areas.

There are also known method of identifying a cause of performance degradation based on topology information of a network and event information such as a performance degradation alert and method of narrowing down a cause section based on topology information and rules for identifying the cause (for example, Patent Literatures 2 and 3).

CITATION LIST

Patent Literature

[Patent Literature 1] Japanese Patent Laid-Open No. 2007-66259
[Patent Literature 2] U.S. Pat. No. 7,043,661
[Patent Literature 3] Japanese Patent Laid-Open No. 2010-86115

Non Patent Literature

[Non Patent Literature 1] http://www.vmware.com/files/pdf/techpaper/Whats-New-VMware-vSphere-50-Storage-Technical-Whitepaper.pdf

SUMMARY OF INVENTION

Technical Problem

When the host computer controls the data movement as in the VM movement, it is difficult for a storage apparatus accessed by the computer to independently control the data movement to improve the performance. For example, one of the computer and the storage apparatus may perform inappropriate data movement. Furthermore, for example, the performance may not be improved by the data movement.

Solution to Problem

A management computer as an aspect of the present invention is connected to a computer and a storage apparatus, the management computer comprising: a memory configured to store first configuration information indicating a plurality of logical storage areas provided by the storage apparatus and a first condition defining a state of the storage apparatus as a trigger for the storage apparatus to move data in one of the plurality of logical storage areas to another one of the plurality of logical storage areas; a CPU connected to the memory; and a network interface for communication between the computer and the storage apparatus. The CPU is configured to acquire a second condition defining a state of the computer as a trigger for the computer to move a first object, which is stored in a first logical storage area among the plurality of logical storage areas and performed by the computer, to another one of the plurality of logical storage areas, acquire second configuration information associating the first object and the first logical storage area, acquire, from the storage apparatus, first state information indicating a state of the plurality of logical storage areas, acquire, from the computer, second state information indicating a state of the first object, determine whether a state of performing data movement from the first logical storage area to another logical storage area is set based on the first condition, the second condition, the first state information, and the second state information, and identify a cause of the state of performing the data movement based on the first configuration information and the second configuration information to control the data movement based on the cause if the state of performing the data movement is set. The plurality of logical storage areas respectively use a plurality of storage media with different performances.

Advantageous Effect of Invention

According to the present invention, the performance of the computer can be improved through collaboration of the control of the data movement by the computer and the control of the data movement by the storage apparatus.

BRIEF DESCRIPTION OF DRAWINGS

FIG. 8 shows an example of a VM movement rule table according to the first embodiment.

FIG. 9 shows an example of a VM performance information table according to the first embodiment.

FIG. 10 shows an example of a storage port catalog performance information table according to the first embodiment.

FIG. 11 shows an example of a storage port performance measurement value table according to the first embodiment.

FIG. 12 shows an example of a storage media catalog performance table according to the first embodiment.

FIG. 13 shows an example of a connection apparatus catalog performance table according to the first embodiment.

FIG. 14 shows an example of a connection apparatus performance measurement value table according to the first embodiment.

FIG. 15 shows an example of first VM data configuration information according to the first embodiment.

FIG. 16 shows continuation of an example of second VM data configuration information according to the first embodiment.

FIG. 17 shows an example of a page movement rule table according to the first embodiment.

FIG. 18 shows an example of a volume performance information table according to the first embodiment.

FIG. 21 is a diagram showing an example of a volume resource information table according to the first embodiment.

FIG. 22 is a chart showing an example of an external storage configuration information table according to the first embodiment.

FIG. 28 shows an example of a VM movement rule table according to a fourth embodiment of the present invention.

FIG. 29 shows an example of a VM performance information table according to the fourth embodiment.

DESCRIPTION OF EMBODIMENTS

Figure 1:
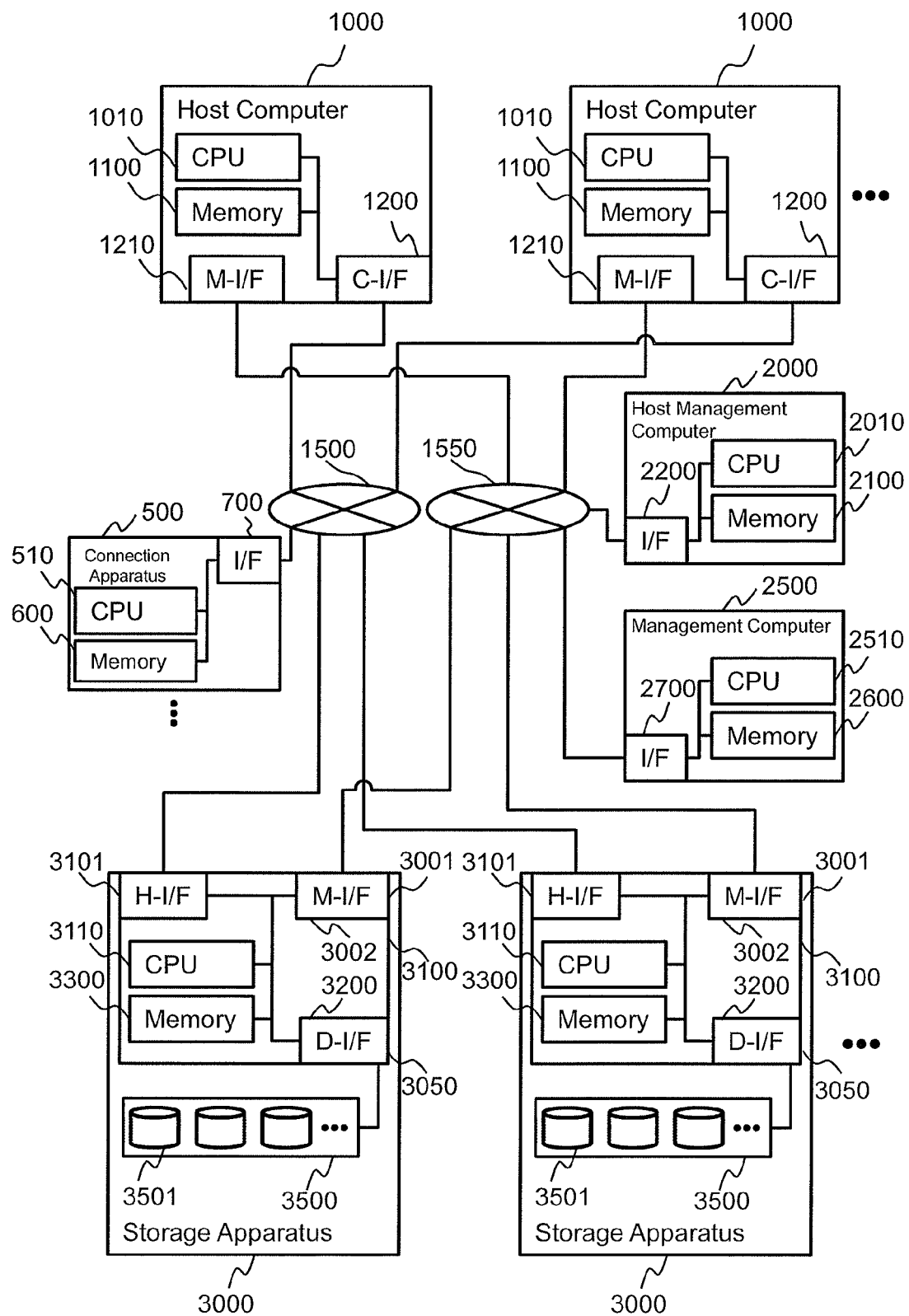
FIG. 1 is a block diagram showing an overall configuration of a computer system according to a first embodiment of the present invention.

Although information of the present invention will be described with expressions such as "aaa table", "aaa list", "aaa DB", and "aaa queue", the information may be expressed by data configurations other than the table, the list, the DB, the queue, and the like. Therefore, "aaa table", "aaa list", "aaa DB", "aaa queue" and the like may be called "aaa information" to show independence from the data configurations.

Although expressions such as "identification information", "identifier", "title", "name", and "ID" will be used to describe the content of the information, the expressions can be mutually replaced.

Although "programs" may be subjects in the following description, a processor executes the programs to execute predetermined processes while using a memory and a communication port (communication control device). Therefore, the processor may be the subject in the description. A computer, such as a management server, or an information processing apparatus may execute disclosed processes in which the programs are the subjects. Dedicated hardware may realize part or all of the programs.

Various programs may be installed on computers through program distribution servers or computer-readable storage media.

A management computer includes an input/output device. Examples of the input/output device include a display, a keyboard, and a pointer device. However, the input/output device may be other devices. In place of the input/output device, a serial interface or an Ethernet interface may serve as the input/output device. A display computer including a display, a keyboard, or a point device may be connected to the interface to transmit display information to a display computer or to receive input information from the display computer. The display by the display computer and the reception of the input from the display computer may replace the input and display by the input/output device.

Hereinafter, a set of one or more computers that manage an information processing system and that display display information of the present invention may be called a management system. When the management computer displays the display information, the management computer serves as the management system, and a combination of the management computer and the display computer also serves as the management system. A plurality of computers may realize processes equivalent to those of the management computer to increase the speed and reliability of the management process. In this case, the plurality of computers (including display computers if the display computers display the information) serve as the management system.

A computer system including a storage apparatus that performs hierarchical storage management and a host computer that controls VM movement will be described. To improve performance of access by VM, the storage apparatus performs data movement based on a data movement rule managed by the storage apparatus. Meanwhile, the host computer performs data movement of VM based on a data movement rule managed by the host computer to improve the performance of access by VM. Therefore, data movement between logical storage areas by the storage apparatus and data movement between storage areas by the host computer may occur in the computer system. To explicitly distinguish the data movements, the unit of data movement by the storage apparatus will be called a page in the following description. The page includes a certain storage capacity. The data movement by the storage apparatus will be called page movement, and the data movement of VM by the host computer will be called VM movement. A data movement rule that defines conditions of the page movement will be called a page movement rule, and a data movement rule that defines conditions of the VM movement will be called a VM movement rule. More specifically, when a page satisfies the conditions defined by the page movement rule, the storage apparatus moves the data in the page to another page. When a state of a VM in execution satisfies the conditions defined by the VM movement rule, the host computer moves the data of the VM to another page.

Two types of cases that pose problems in the computer system will be illustrated below.

A first case is a case in which access performance cannot be improved by the VM movement performed by the host computer. In this case, the host computer performs unnecessary VM movement because the destination of the VM movement is inappropriate. For example, the first case occurs when the cause of the VM movement is reduction of the response speed due to high load of a storage port. In this case, the host computer moves the VM according only to the VM movement rule. Therefore, the host computer cannot identify the storage area of the destination for improving the performance of the VM. This may cause the VM to move to an unused storage area that uses the same storage port as the original storage area. As a result, the performance of the VM is not improved.

A second case is a case in which the page movement by the storage apparatus leads to wasteful VM movement. In this case, the VM movement rule of the host computer is not taken into account in the page movement rule of the storage apparatus. Therefore, the storage apparatus performs data movement that may cause unnecessary VM movement. For example, the second case occurs when the number of I/Os (requests) from the host computer to data with short request response time is reduced. In this case, since the number of I/Os from the host computer is reduced, the storage apparatus moves data with a small number of I/Os to a low (low-speed) storage hierarchy according to the page movement rule of the storage apparatus. As a result, the response time from the host computer is reduced, and the response time violates the VM movement rule of the host computer. The host computer performs unnecessary VM movement.

Since the host computer and the storage apparatus are overloaded during the movement of real data in the page movement and the VM movement, the performance of access to the host computer is reduced. Therefore, excessive data movement is not preferable.

In this way, an object of the technique is to improve the cases that cause the problems when a plurality of data movement entities, such as the storage apparatuses and the host computers, attempt to move data without taking the other data movement entities into account. The application targets are not limited to the two types of cases.

First Embodiment

A first embodiment will be described with reference to the drawings.

FIG. 1 shows an overall configuration of the computer system according to a first embodiment. The computer system of the present embodiment includes host computers 1000, a connection apparatus 500, and storage apparatuses 3000. The host computers 1000, the connection apparatus 500, and the storage apparatuses 3000 are connected through a data network 1500. The computer system further includes a host management computer 2000 and a management computer 2500. The host computers 1000, the host management computer 2000, the management computer 2500, and the storage apparatuses 3000 are connected through a management network 1550.

Although the data network 1500 is, for example, a SAN (Storage Area Network), the data network 1500 may be an IP (Internet Protocol) network or may be another data communication network. Although the management network 1550 is, for example, an IP network, the management network 1550 may be a SAN or may be another data communication network. The data network 1500 and the management network 1550 may be the same network. The host computers 1000, the host management computer 2000, and the management computer 2500 may be the same computer.

The host computer 1000 includes a control device, such as a CPU (Central Processing Unit) 1010, a storage device, such as a memory 1100, an M-I/F (Management-Interface) 1210, and a C-I/F (Communication-Interface) 1200. The host computer 1000 may include an input/output device (such as a keyboard and a display device). The CPU 1010 executes programs stored in the memory 1100. Hereinafter, any apparatus called a CPU is configured to execute programs stored in the memory connected to the CPU. The M-I/F 1210 is an interface with the management network 1550 and is configured to transfer data and control commands to and from the storage apparatuses 3000, the host management computer 2000, and the management computer 2500. The C-I/F 1200 is an interface with the data network 1500 and is configured to transfer data and control commands to and from the storage apparatuses 3000 and the connection apparatus 500.

The host management computer 2000 includes a CPU 2010, a memory 2100, and an I/F 2200. The host management computer 2000 may include an input/output device (such as a keyboard and a display device). The I/F 2200 is an interface with the management network 1550 and is configured to transfer data and control commands to and from the storage apparatuses 3000, the host computers 1000, and the management computer 2500. Details of programs stored in the memory 2100 will be described later.

The management computer 2500 includes a CPU 2510, a memory 2600, and an I/F 2700. The management computer 2500 may include an input/output device (such as a keyboard and a display device). The I/F 2700 is an interface with the management network 1550 and is configured to transfer data and control commands to and from the storage apparatuses 3000, the host computers 1000, and the host management computer 2000. Details of programs stored in the memory 2600 will be described later.

The connection apparatus 500 includes a CPU 510, a memory 600, and an I/F 700. The connection apparatus 500 may include an input/output device (such as a keyboard and a display device). The connection apparatus 500 is, for example, a switch such as an FC (Fibre Channel) switch. The I/F 700 is an interface with the data network 1500 and is configured to transfer data and control commands to and from the storage apparatuses 3000 and the host computers 1000. Details of programs stored in the memory 600 will be described later.

The storage apparatus 3000 includes a disk controller 3100 and a disk apparatus 3500. The disk controller 3100 includes a CPU 3110, a memory 3300, an M-I/F 3001, an H-I/F (Host-Interface) 3101 as a storage port, and a D-I/F (Disk-Interface) 3050. The M-I/F 3001 is an interface with the management network 1550 and is configured to transfer data and control commands to and from the host computers 1000, the host management computer 2000, and the management computer 2500. The H-I/F 3101 is an interface with the data network 1500 and is configured to transfer data and control commands to and from the host computers 1000 and the connection apparatus 500. The D-I/F 3050 transfers data and control commands to and from the disk apparatus 3500. The disk apparatus 3500 includes a plurality of physical storage media 3501.

Although the example of FIG. 1 includes two host computers 1000, two storage apparatuses 3000, one host management computer 2000, and one management computer 2500, the present invention is not limited to the configuration. Although the host management computer 2000 is configured to manage the host computers 1000 in the present embodiment, the present invention is not limited to the configuration. The host computers 1000 may execute the processes of the host management computer 2000, and the host computers 1000 may replace the host management computer 2000 in the following description.

Figure 2:
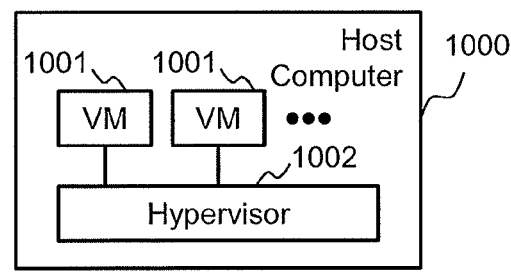
FIG. 2 is a block diagram showing a logical configuration of a host computer according to the first embodiment.

FIG. 2 shows a logical configuration of the host computer 1000. The host computer 1000 includes a hypervisor (hereinafter, also called "HV") 1002 that can logically generate VMs 1001 to execute the VMs 1001. The data HV 1002 can control a plurality of VMs 1001 at once. Each of the plurality of VMs 1001 can execute applications as if the VM 1001 is a stand-alone physical computer.

Figure 3:
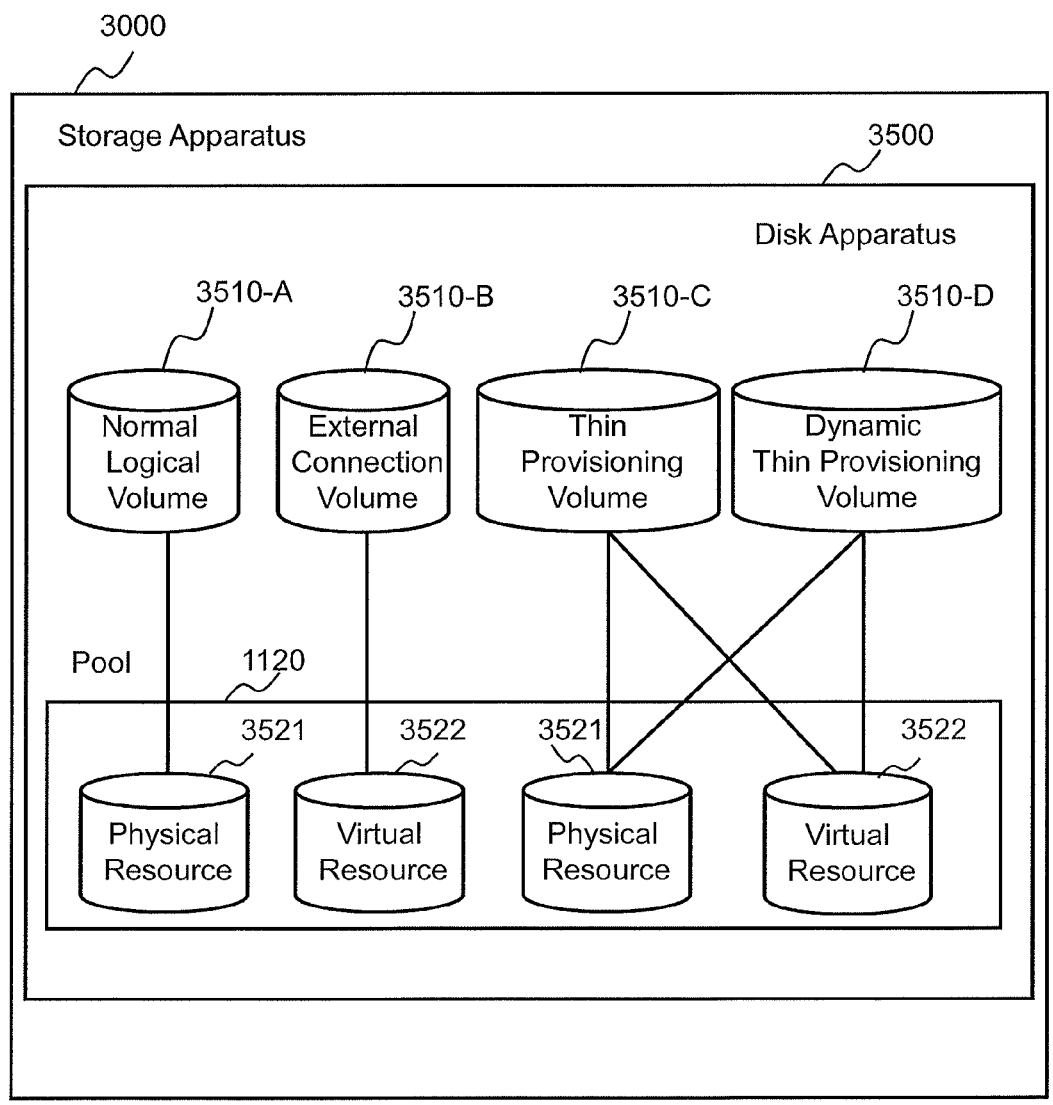
FIG. 3 is a block diagram showing a configuration of a disk device according to the first embodiment.

FIG. 3 is a schematic diagram showing a configuration of a logical volume 3510 created using the storage apparatus 3000. The storage apparatus 3000 uses the plurality of physical storage media 3501 in the disk apparatus 3500 to create the logical volume 3510. Examples of the logical volume 3510 include a normal logical volume 3510A, an external connection volume 3510B, a thin provisioning volume 3510C, and a dynamic thin provisioning volume 3510D. A plurality of logical volumes 3510 may be created in the storage apparatus 3000. The plurality of logical volumes 3510 may be the same type or different types.

A pool 1120 includes one or more physical resources 3521 or one or more virtual resources 3522. In the present embodiment, logical devices on a RAID (Redundant Array of Independent Disks) constructed using the plurality of physical storage media 3501 are defined as the physical resources 3521. In a storage apparatus 3000, logical devices created in an external storage apparatus (external connection storage system) as another storage apparatus 3000 connected to the storage apparatus 3000 are defined as the virtual resources 3522. The pool 1120 is a group of logical devices for collectively managing the physical resources 3521 or the virtual resources 3522 from a standpoint of management. An example of the standpoint of management includes a RAID type. Examples of the RAID type include a RAID 0 that is provided as a huge storage area integrating a plurality of storage devices to provide a large capacity and a RAID 1 that performs mirroring between storage devices to increase redundancy of the storage devices. Although the physical resources 3521 and the virtual resources 3522 are mixed in the pool 1120 in FIG. 3 for the convenience of the description, the pool 1120 may include only the physical resources 3521 or may include only the virtual resources 3522. Examples of the plurality of physical storage media 3501 include HDDs and SSDs (Solid State Drives) of SATA (Serial Advanced Technology Attachment) and SAS (Serial Attached SCSI: small computer system interface). A plurality of types of media with different performances may be allocated to the plurality of physical resources 3521 and virtual resources 3522. The storage apparatus 3000 may also include a plurality of pools 1120.

The normal logical volume 3510A is a logical volume created using the physical resource 3521 using the physical storage medium 3501.

The external connection volume 3510B is a logical volume created using the virtual resource 3522, and the entity of the storage area exists in an external storage apparatus.

The thin provisioning volume 3510C is a logical volume that can dynamically expand the capacity. Thin provisioning is a technique of allocating a partial area (hereinafter, called "segment") of a physical storage area to a logical volume to allow dynamically expanding the storage area to effectively utilize the storage area. The physical resource 3521 or the virtual resource 3522 provides the segment to be allocated to the thin provisioning volume 3510C. When I/O from the host computer 1000 is received, the segment can be allocated from the physical resource 3521 or the virtual resource 3522 included in the pool 1120 to the thin provisioning volume 3510C to dynamically expand the capacity of the thin provisioning volume 3510C.

Like the thin provisioning volume 3510C, the dynamic thin provisioning volume 3510D is a logical volume that can dynamically expand the capacity. After a segment is allocated to the dynamic thin provisioning volume 3510D, the segment can be dynamically changed to another segment with different responsibility or reliability according to the status of access to the dynamic thin provisioning volume 3510D. Although the segments are allocated from both the physical resource 3521 and the virtual resource 3522 to the thin provisioning volume 3510C and the dynamic thin provisioning volume 3510D in FIG. 3 for the convenience of the description, the segments may be allocated only from one of the physical resource 3521 and the virtual resource 3522.

Figure 4:
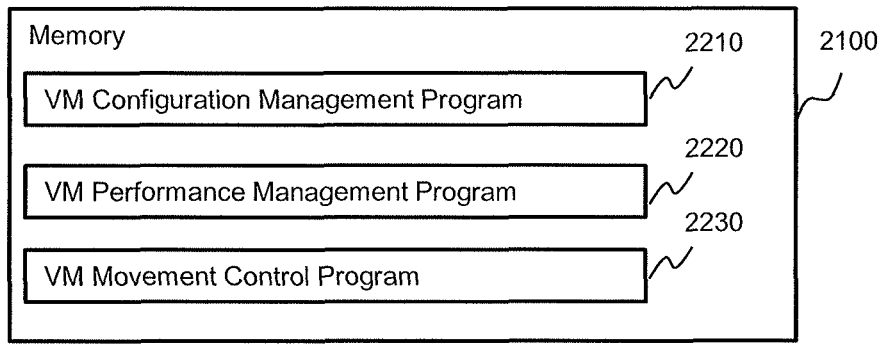
FIG. 4 is a block diagram showing an internal configuration of a memory of a host management computer according to the first embodiment.

FIG. 4 is a block diagram showing a configuration of information stored in the memory 2100 of the host management computer 2000. The memory 2100 stores a VM configuration management program 2210, a VM performance management program 2220, and a VM movement control program 2230.

The VM configuration management program 2210 is a program for managing configuration information of the VM 1001 of the host computer 1000. The VM configuration management program 2210 communicates with a VM information acquisition program 2610 of the management computer 2500 described later to transfer various information.

The VM performance management program 2220 is a program for managing performance information indicating performance of the VM 1001 of the host computer 1000. An example of the performance information of the VM 1001 includes periodically measured response time. The VM performance management program 2220 communicates with the VM information acquisition program 2610 of the management computer 2500 described later to transfer various information.

The VM movement control program 2230 is a program for managing the VM movement rule as a rule of the movement of the VM 1001 of the host computer 1000 and for moving the VM according to the VM movement rule. The VM movement control program 2230 communicates with the host computer 1000 and the VM information acquisition program 2610 of the management computer 2500 described later to transfer various information. If the VM movement control program 2230 determines to move the VM according to the VM movement rule, the VM movement control program 2230 may output the determination to the display device and may actually perform the VM movement in response to a user operation received through the input device.

Figure 5:
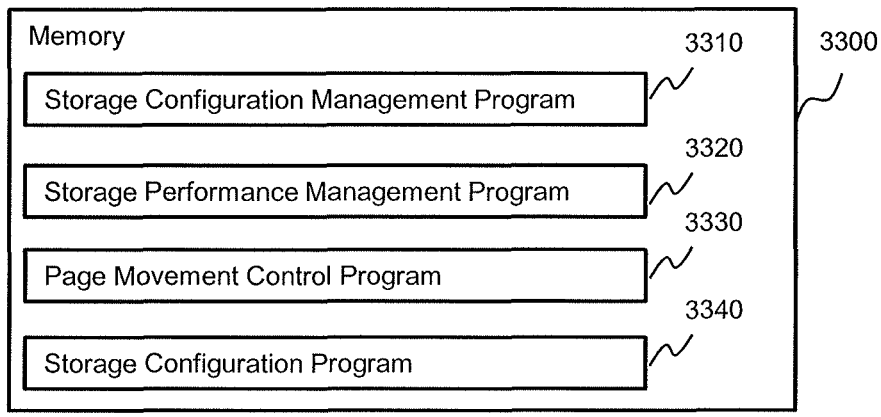
FIG. 5 is a block a diagram showing an internal configuration of a memory of a storage apparatus according to the first embodiment.

FIG. 5 is a block diagram showing a configuration of information stored in the memory 3300 of the storage apparatus 3000. The memory 3300 stores a storage configuration management program 3310, a storage performance management program 3320, a page movement control program 3330, and a storage configuration program 3340.

The storage configuration management program 3310 is a program for managing configuration information of the storage apparatus 3000. The storage configuration management program 3310 communicates with a storage information acquisition program 2630 of the management computer 2500 described later to transfer various information.

The storage performance management program 3320 is a program for managing performance information of the storage apparatus 3000. An example of the performance information of the storage apparatus 3000 includes periodically measured IOPS (Input Output Per Second) of each page. The storage performance management program 3320 communicates with the storage information acquisition program 2630 of the management computer 2500 described later to transfer various information.

The page movement control program 3330 is a program for managing the page movement rule as a rule for moving the page in the storage apparatus 3000 and for moving (also called migration) the page according to the page movement rule. The page movement control program 3330 communicates with the storage information acquisition program 2630 and a data movement overall control program 2670 of the management computer 2500 to transfer various information. When the page movement control program 3330 determines that the page movement is necessary based on the page movement rule, the page movement control program 3330 transmits a sign of the page movement to the data movement overall control program 2670 of the management computer 2500 before performing the page movement.

The storage configuration program 3340 is a program for executing various configurations of the storage apparatus 3000. In the present embodiment, the various configurations of the storage apparatus 3000 include configurations for improving the performance of access to the host computer 1000, such as a configuration for securing a cache area for temporarily storing read and write data for the logical volume 3510 and the physical resource 3521 and a configuration for securing a processor that executes a read and write process for the logical volume. The storage configuration program 3340 communicates with the data movement overall control program 2670 of the management computer 2500 described later to transfer various information.

Figure 6:
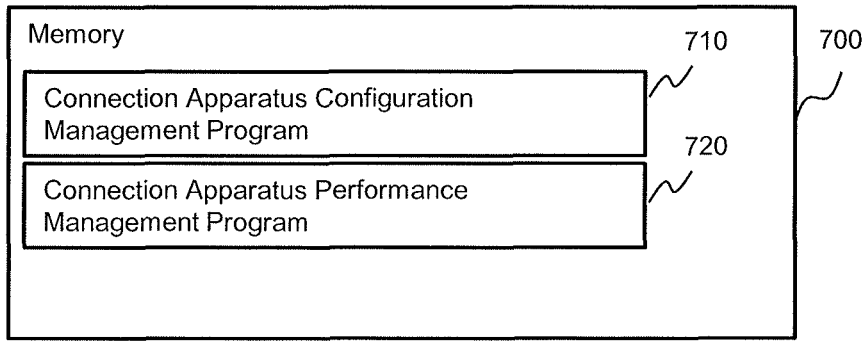
FIG. 6 is a block diagram showing an internal configuration of a memory of a connection apparatus according to the first embodiment.

FIG. 6 is a block diagram showing a configuration of information stored in the memory 600 of the connection apparatus 500. The memory 600 stores a connection apparatus configuration management program 710 and a connection apparatus performance management program 720.

The connection apparatus configuration management program 710 is a program for managing configuration information of the connection apparatus 500. The connection apparatus configuration management program 710 communicates with a connection apparatus information acquisition program 2650 of the management computer 2500 described later to transfer various information.

The connection apparatus performance management program 720 is a program for managing the performance information of the connection apparatus 500. Examples of the performance information of the connection apparatus 500 include an amount of transferred data, load of the CPU 510, and a used amount of the memory 600, and the performance information is periodically measured. The connection apparatus performance management program 720 communicates with the connection apparatus information acquisition program 2650 of the management computer 2500 described later to transfer various information.

Figure 7:
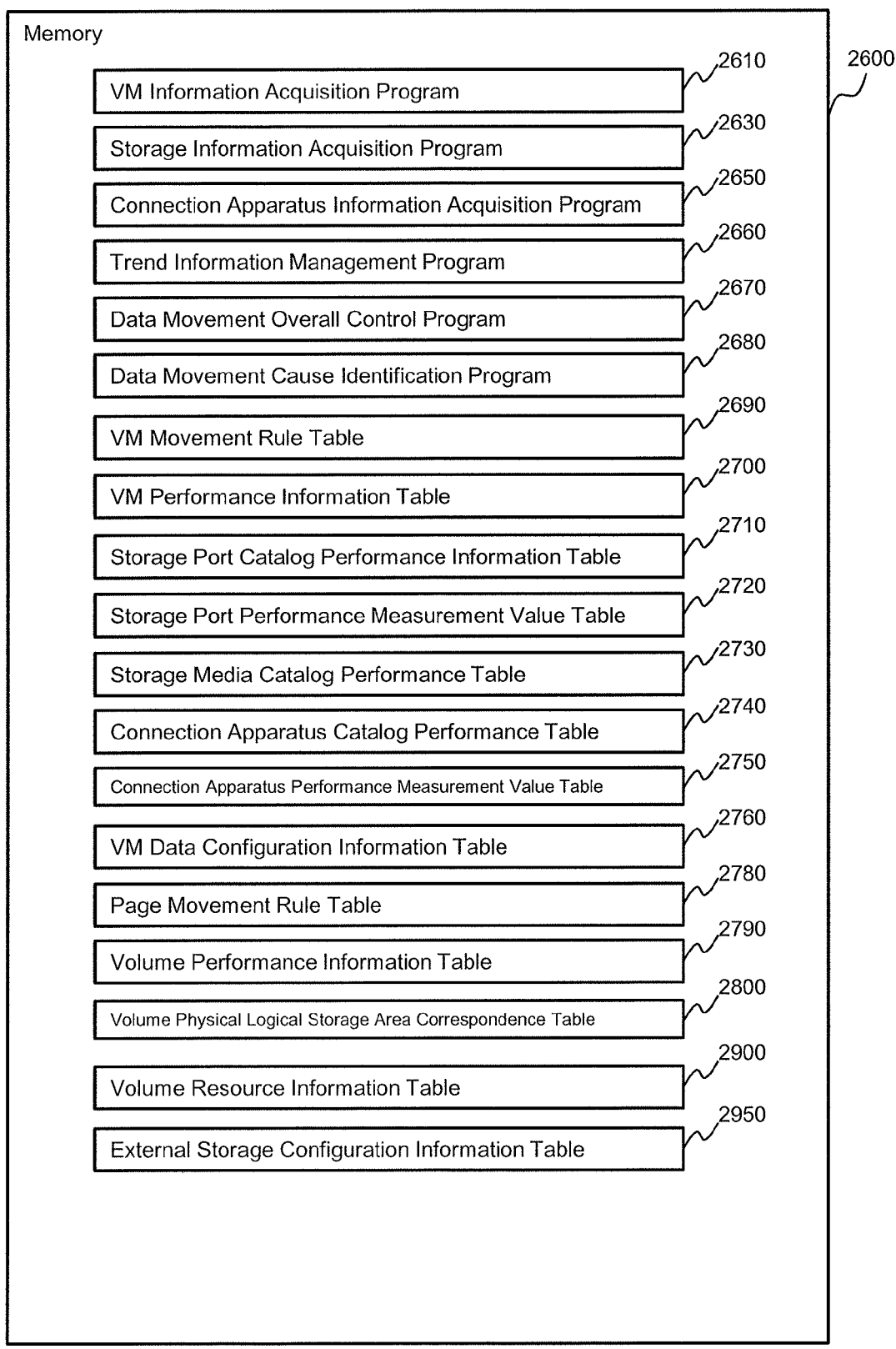
FIG. 7 is a block diagram showing an internal configuration of a memory of a management computer according to the first embodiment.

FIG. 7 is a block diagram showing a configuration of information stored in the memory 2600 of the management computer 2500. The memory 2600 stores programs including the VM information acquisition program 2610, the storage information acquisition program 2630, the connection apparatus information acquisition program 2650, a trend information management program 2660, the data movement overall control program 2670, and a data movement cause identification program 2680.

The memory 2600 further stores an information table including a VM movement rule table 2690, a VM performance information table 2700, a storage port catalog performance information table 2710, a storage port performance measurement value table 2720, a storage media catalog performance table 2730, a connection apparatus catalog performance table 2740, a connection apparatus performance measurement value table 2750, a VM data configuration information table 2760, a page movement rule table 2780, a volume performance information table 2790, a volume physical logical storage area correspondence table 2800, a volume resource information table 2900, and an external storage configuration information table 2950.

The VM movement rule table 2690 shown in FIG. 8 is a table for managing VM movement rules as rules for the host management computer 2000 to move the VM 1001 of the host computer 1000. The VM movement rule table 2690 includes a rule ID 2691 indicating the VM movement rule, an HV ID 2692 indicating the HV 1002, a VM ID 2693 indicating the VM 1001, a time interval 2694 of actually carrying out the VM movement by applying the VM movement rule, and a VM movement rule 2695 indicating conditions and the like for moving the VM 1001. The table further defines a correspondence between the pieces of information included in the table. The VM movement rule 2695 defines, for example, a rule for moving the VM 1001 when the response time of the I/O of the VM 1001 is over 15 ms. The response time is time from an I/O request for the VM 1001 to a response, and the response time indicates latency of the I/O including transfer delay. Although the response time of the I/O of the VM 1001 is used as an index of the VM movement rule 2695 in the present embodiment, the arrangement is not limited to this. As described later in a fourth embodiment, a capacity utilization rate may be used as an index in the rule, or other rules may be used. The unit of the time interval 2694 is, for example, time (h). Every time the time indicated in the time interval 2694 has passed, the host management computer 2000 determines whether performance measurement value has satisfied the condition defined in the VM movement rule.

The host management computer 2000 can configure the VM movement rule based on an input from the user. For example, the host management computer 2000 can acquire thresholds of the response time and the capacity utilization rate through a GUI (Graphical User Interface).

The VM performance information table 2700 shown in FIG. 9 is a table for managing the performance information of the VM 1001. The VM performance information table 2700 includes an HV ID 2701 indicating the HV 1002 that is operating the target VM 1001, a VM ID 2702 indicating the target VM 1001, a measurement time 2703 that is time of the measurement of the performance, and a response time 2704 as a performance measurement value. The table further defines a correspondence between the pieces of information included in the table. The index used for the performance information is response time (ms) in the present embodiment, and the index corresponds to the index indicated in the VM movement rule 2695 of the VM movement rule table 2690. Therefore, when the index of the VM movement rule 2695 is changed, the performance information after the change is collected and stored in the VM performance information table 2700. Similar processes are applied to other indexes in the following description.

The storage port catalog performance information table 2710 shown in FIG. 10 is a table for managing catalog performance information of the H-I/F 3101 as a storage port of the storage apparatus 3000. The storage port catalog performance information table 2710 includes a storage ID 2711 of the storage apparatus 3000 that includes the target storage port, a port ID 2712 indicating the target storage port, a high load criteria 2713 as an amount of transferred read data when the response time particularly starts to be long due to an increase in the amount of transferred read data (MB/s) of the target storage port, and a high load criteria 2714 as an amount of transferred write data when the response time particularly starts to be long due to an increase in the amount of transferred write data (MB/s) of the target storage port. The table further defines a correspondence between the pieces of information included in the table. For example, values indicated in the catalog or manual of the target storage apparatus can be used for the high load criteria 2713 and the high load criteria 2714.

The storage port performance measurement value table 2720 shown in FIG. 11 is a table for managing performance measurement values of the H-I/F 3101 as the storage port of the storage apparatus 3000. The storage port performance measurement value table 2720 includes a storage ID 2721 indicating the storage apparatus 3000 that includes the target storage port, a port ID 2722 indicating the target storage port, a measurement time 2723 that is time of the measurement of the performance, an amount of transferred read data 2724 as a performance measurement value of the amount of transferred read data (MB/s) of the target storage port, and an amount of transferred write data 2725 as a performance measurement value of the amount of transferred write data (MB/s) of the target storage port. The table further defines a correspondence between the pieces of information included in the table.

The storage media catalog performance table 2730 shown in FIG. 12 is a table for managing catalog performance information of media of the sources comprising the logical volumes 3510 of the storage apparatus 3000. The physical resources 3521 or the virtual resources 3522 are the resources comprising the logical volumes 3510. The storage media catalog performance table 2730 includes a storage ID 2731 indicating the storage apparatus 3000 that includes the target resource, a resource type 2732 of the target resource, a read rate 2733 as a read speed (MB/s) of the target resource, and a write rate 2734 as a write speed (MB/s) of the target resource. The table further defines a correspondence between the pieces of information included in the table.

The connection apparatus catalog performance table 2740 shown in FIG. 13 is a table for managing catalog performance information of the I/F 700 as a connection apparatus port of the connection apparatus 500. The connection apparatus catalog performance table 2740 includes a connection apparatus ID 2741 indicating the connection apparatus 500 that includes the target connection apparatus port, a port ID 2742 indicating the target connection port, a high load criteria 2743 as an amount of transferred read data (MB/s) with which the response time particularly starts to be long in the target connection apparatus port, and a high load criteria 2744 as an amount of transferred write data (MB/s) with which the response time particularly starts to be long in the target connection apparatus port. The table further defines a correspondence between the pieces of information included in the table. For example, values indicated in the catalog or manual of the target connection apparatus port can be used for the high load criteria 2743 and the high load criteria 2744.

The connection apparatus performance measurement value table 2750 shown in FIG. 14 is a table for managing performance measurement values of the I/F 700 as a connection apparatus port of the connection apparatus 500. The connection apparatus performance measurement value table 2750 includes a connection apparatus ID 2751 indicating the connection apparatus 500 that includes the target connection apparatus port, a port ID 2752 indicating the target connection apparatus port, a measurement time 2753 that is time of the measurement of the performance, an amount of transferred read data 2754 as a performance measurement value of the amount of transferred read data (MB/s) of the target connection apparatus port, and an amount of transferred write data 2755 as a performance measurement value of the amount of transferred write data (MB/s) of the target connection apparatus port. The table further defines a correspondence between the pieces of information included in the table.

FIG. 15 shows first VM data configuration information 2760A in the VM data configuration information table 2760, and FIG. 16 shows second VM data configuration information 2760B in the VM data configuration information table 2760. The VM data configuration information table 2760 is a table for managing association between the VM 1001 and the logical volume 3510 storing the real data of the VM 1001. The first VM data configuration information 2760A of the VM data configuration information table 2760 includes an HV ID 2761 indicating the HV 1002 holding the target VM 1001, a VM ID 2762 indicating the target VM 1001, a connection apparatus ID 2763 indicating the target connection apparatus 500 as a communication path between the target HV 1002 and the storage apparatus 3000, a connection apparatus initiator port ID 2764 indicating the port of the host computer 1000 in the target connection apparatus 500, and a connection apparatus target port ID 2765 indicating the port of the storage apparatus 3000 in the target connection apparatus 500. The second VM data configuration information 2760B of the VM data configuration information table 2760 includes a storage ID 2767 indicating the target storage apparatus 3000 storing the data of the target VM 1001, a storage port ID 2768 indicating the storage port of the target storage apparatus 3000, a logical volume ID 2769 indicating the target logical volume 3510, and LBA information 2770 indicating a range of LBA (Logical Block Addressing) in the target logical volume 3510. The VM data configuration information table 2760 further defines a correspondence between the pieces of information included in the first VM data configuration information 2760A and the second VM data configuration information 2760B. An entry with "null" in the VM ID 2762 of the VM data configuration information table 2760 denotes a state in which the logical volume 3510 is allocated to the host computer 1000 including the HV 1002, but the logical volume 3510 is not used for the VM 1001. An entry with "null" in the LBA 2770 denotes a state in which the logical volume 3510 is allocated to the host computer 1000, but the page is not allocated to the logical volume 3510 yet.

The page movement rule table 2780 shown in FIG. 17 is a table for managing the page movement rules of the storage apparatus 3000. The page movement rule table 2780 includes a rule ID 2781 indicating the target page movement rule, a priority 2782 of a target page movement rule among some page movement rules defined in the page movement rule table 2780, a time interval 2783 for actually carrying out the page movement by applying the target page movement rule, and a page movement rule 2784 that defines conditions and the like of the movement of the target page. The table further defines a correspondence between the pieces of information included in the table. The page movement rule 2784 defines, for example, a first page movement rule indicating that data with higher IOPS is to be arranged on a faster medium, such as by moving the data to a page with a resource type SATA if the IOPS to the target page is below 700. In place of the first page movement rule, the page movement rule 2784 may also define a second page movement rule or the like indicating that data of an arbitrary VM 1001 is to be arranged on a specific resource type such as SSD, regardless of the IOPS to the page. When the first page movement rule and the second page movement rule are applied at the same time, a medium faster than the hard disk, such as SSD, can be allocated to data with low IOPS that requires a short (fast) response time, while applying the first page movement rule. The unit of the time interval 2783 is, for example, time (h). Every time the time indicated in the time interval 2783 has passed, the management computer 2500 determines whether the measurement result satisfies the conditions defined in the page movement rule.

The page movement rule 2784 may include an LBA fixation rule 2785. The LBA fixation rule 2785 is an example of the second page movement rule. The LBA fixation rule 2785 is a page movement rule for prohibiting the movement of the page storing the data of the target VM 1001 and fixing the page to the LBA of the current resource. An example of the LBA fixation rule 2785 indicates that the VM 1001 is to be arranged on the SSD if VM ID=3.

The volume performance information table 2790 shown in FIG. 18 is a table for managing the frequency of access to the logical volume 3510. The volume performance information table 2790 includes a storage ID 2791 indicating the storage apparatus 3000 that includes the target logical volume 3510, a logical volume ID 2792 indicating the target logical volume 3510, a page ID 2793 indicating the target page in the target logical volume 3510, an IOPS 2794 indicating the measurement result of IOPS to the target page, and a rule ID 2795 indicating the page movement rule applied to the target page. The table further defines a correspondence between the pieces of information included in the table.

Figures 19, 20:
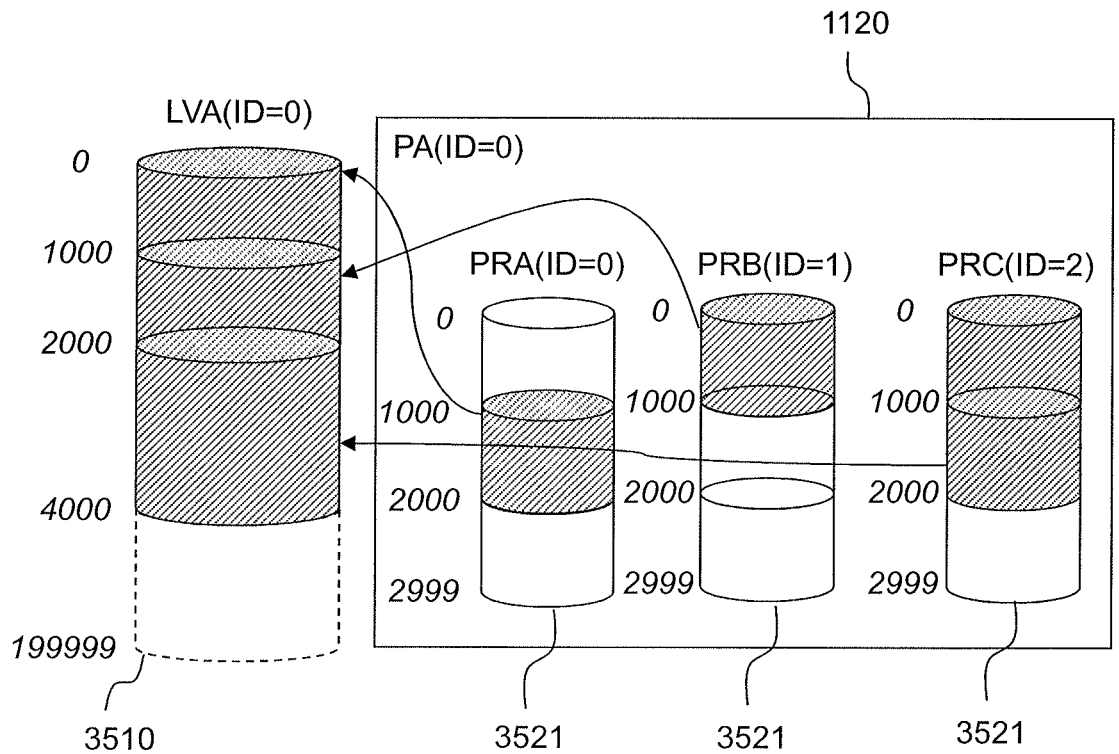
FIG. 19 shows an example of a volume physical logical storage area correspondence table according to the first embodiment.
FIG. 20 is a schematic diagram showing a state indicated in the volume physical logical storage area correspondence table according to the first embodiment.

The volume physical logical storage area correspondence table 2800 shown in FIG. 19 is a table managing the correspondence between the LBA in the logical volume 3510 and the LBA in the physical resource 3521 or the virtual resource 3522. The volume physical logical storage area correspondence table 2800 includes a logical volume ID 2801 indicating the target logical volume 3510, a page ID 2802 indicating the target page of the target logical volume 3510, LBA information 2803 indicating the range of the LBA of the target page, a pool ID 2804 indicating the pool 1120 to which the resource used in the target page belongs, a resource ID 2805 indicating the resource used in the target page, and LBA information 2806 indicating the range of the LBA allocated to the target page in the target resource. The table further defines a correspondence between the pieces of information included in the table.

FIG. 20 is a schematic diagram showing a state of the logical volume 3510 and the pool 1120 shown in the volume physical logical storage area correspondence table 2800. In the example, a PRA as a physical resource 3521 indicated by "0" in the resource ID 2805, a PRB as a physical resource 3521 indicated by "1" in the resource ID 2805, and a PRC as a physical resource 3521 indicated by "2" in the resource ID 2805 are created in a PA as a pool 1120 indicated by "1" in the pool ID 2804. An LVA as a logical volume 3510 indicated by "0" in the logical volume ID 2801 is also created. From an address 1000 to an address 1999 of the PRA correspond to from an address 0 to an address 999 of the LVA. From an address 0 to an address 999 of the PRB correspond to from an address 1000 to an address 1999 of the LVA. From an address 0 to an address 2999 of the PRC correspond to from an address 2000 to an address 3999 of the LVA. None of the physical resources 3521 is allocated to from an address 4000 to an address 199999 of the LVA. When the dynamic thin provisioning volume 3510D is used for the logical volume 3510, the correspondence between the logical volume 3510 and the pool 1120 is dynamically changed.

The volume resource information table 2900 shown in FIG. 21 is a table for managing the information of the physical resources 3521 and the virtual resources 3522. The volume resource information table 2900 includes a storage ID 2901 indicating the target storage apparatus 3000, a pool ID 2902 indicating the pool 1120 to which the target resource belongs, a resource ID 2903 indicating the target resource, a medium type 2904 of the target resource such as SATA, SSD, and FC (Fibre Channel), and a resource configuration 2905 indicating whether the target resource is the physical resource 3521 or the virtual resource 3522. The table further defines a correspondence between the pieces of information included in the table. In the resource configuration 2905 of the volume resource information table 2900, the physical resource 3521 as a resource inside of the target storage apparatus 3000 is indicated by "inside", and the virtual resource 3522 as a resource in the external storage apparatus connected to the target storage apparatus 3000 is indicated by "outside".

The external storage configuration information table 2950 shown in FIG. 22 is a table for managing the configuration of the virtual resource 3522. The external storage configuration information table 2950 includes a storage ID 2951 indicating the target storage apparatus 3000, a resource ID 2952 indicating the target virtual resource 3522, a port ID 2953 indicating the H-I/F 3101 as a storage port used for the external connection in the target storage apparatus 3000, an external storage ID 2954 indicating the target external storage apparatus, an external storage resource ID 2955 indicating the physical resource 3521 in the target external storage apparatus corresponding to the target virtual resource 3522, and an external storage port ID 2956 indicating the H-I/F 3101 as a port used for the external connection in the external storage apparatus. The table further defines a correspondence between the pieces of information included in the table.

Details of an operation of the management computer 2500 will be described.

Processes of the VM information acquisition program 2610 will be described. The VM information acquisition program 2610 executes a process of acquiring the configuration information of the VM 1001 from the VM configuration management program 2210 of the host management computer 2000 and storing the configuration information in the VM data configuration information table 2760. Specifically, the VM information acquisition program 2610 associates the configuration information of the storage apparatuses 3000 with the configuration information of the connection apparatuses 500 and stores the configuration information in the VM data configuration information table 2760. The VM information acquisition program 2610 executes a process of acquiring the performance information of the VM 1001 from the VM performance management program 2220 of the host management computer 2000 and storing the performance information in the VM performance information table 2700. The VM information acquisition program 2610 executes a process of acquiring the VM movement rule of the VM 1001 from the VM movement control program 2230 of the host management computer 2000 and storing the VM movement rule in the VM movement rule table 2690. The VM information acquisition program 2610 may periodically execute the processes or may execute the processes according to a user operation.

The storage information acquisition program 2630 executes a process of acquiring the configuration information of the storage apparatus 3000 from the storage configuration management program 3310 of the storage apparatus 3000 and changing the VM data configuration information table 2760, the volume physical logical storage area correspondence table 2800, the volume resource information table 2900, and the external storage configuration information table 2950 based on the acquired configuration information. Specifically, the storage information acquisition program 2630 associates the configuration information of the connection apparatuses 500 with the configuration information of the VMs 1001 and stores the configuration information in the VM data configuration information table 2760. The storage information acquisition program 2630 executes a process of acquiring the performance information from the storage performance management program 3320 and changing the storage port catalog performance information table 2710, the storage port performance measurement value table 2720, the storage media catalog performance table 2730, and the volume performance information table 2790 based on the acquired performance information. The storage information acquisition program 2630 executes a process of acquiring the page movement rule from the page movement control program 3330 and storing the acquired page movement rule in the page movement rule table 2780. The storage information acquisition program 2630 may periodically execute the processes or may execute the processes according to a user operation.

The connection apparatus information acquisition program 2650 executes a process of acquiring the configuration information of the connection apparatus 500 from the connection apparatus configuration management program 710 of the connection apparatus 500 and storing the acquired configuration information in the VM data configuration information table 2760. Specifically, the connection apparatus information acquisition program 2650 associates the configuration information of the storage apparatuses 3000 with the configuration information of the VMs 1001 and stores the configuration information in the VM data configuration information table 2760. The connection apparatus information acquisition program 2650 executes a process of acquiring the performance information from the connection apparatus performance management program 720 and changing the connection apparatus catalog performance table 2740 and the connection apparatus performance measurement value table 2750 based on the acquired performance information. The connection apparatus information acquisition program 2650 may periodically execute the processes or may execute the processes according to a user operation.

A process of the trend information management program 2660 will be described.

The trend information management program 2660 may periodically execute the following process or may execute the process according to a user operation. The trend information management program 2660 executes a process of acquiring the performance information of the storage apparatus 3000, the connection apparatus 500, and the VM 1001, calculating predicted performance information as a predicted value of the performance information after a predetermined operation period from the present time based on the acquired performance information, and when a sign of the VM movement or the page movement is detected based on the calculated predicted performance information, notifying the data movement overall control program 2670 of the sign.

Figure 23:
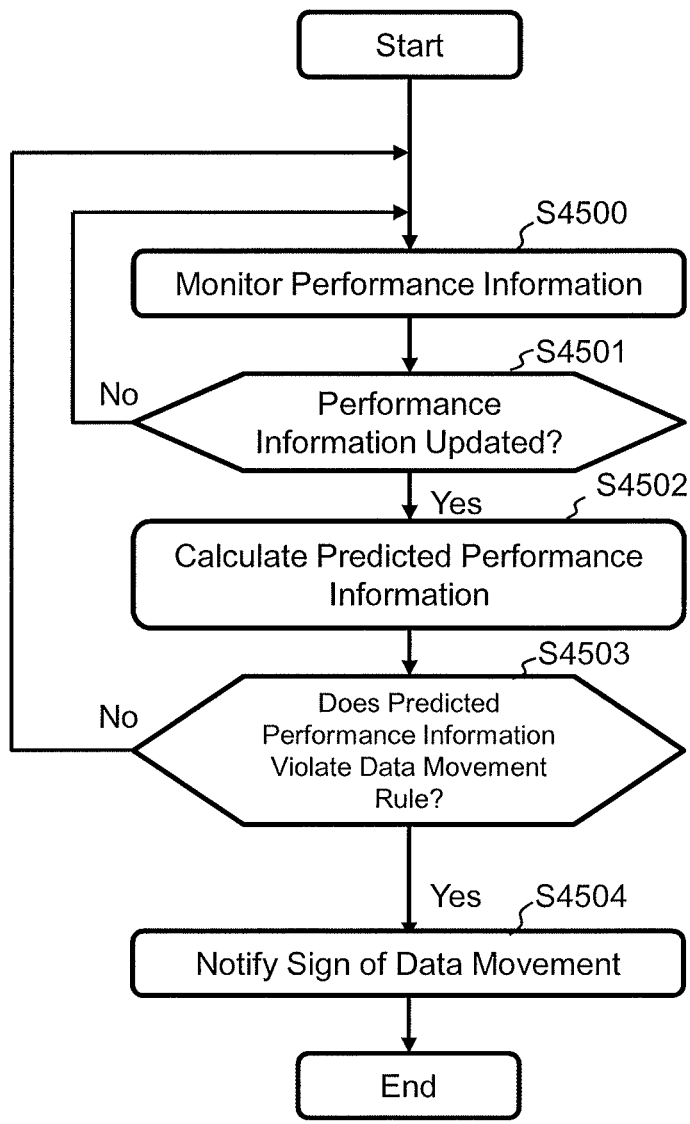
FIG. 23 is a flow chart showing a process of a trend information management program according to the first embodiment.

FIG. 23 shows the process of the trend information management program 2660. The trend information management program 2660 first monitors the performance information in the VM performance information table 2700, the storage port performance measurement value table 2720, and the connection apparatus performance measurement value table 2750 (S4500) and determines whether the performance information is updated from the previous monitoring (S4501).

If the result of S4501 is No, the trend information management program 2660 returns the process to S4500. The trend information management program 2660 may wait for a predetermined standby time before executing the next S4500.

If the result of S4501 is Yes, the trend information management program 2660 calculates the performance information after the predetermined operation period to set predicted performance information (S4502). The trend information management program 2660 may use the least squares method as the calculation method of the predicted performance information or may use other methods. When the least squares method is used, for example, a line or a curve indicating a time change of the response time is calculated from, for example, a time change of the measurement value of the response time. The trend information management program 2660 may calculate a tendency of the measurement value of the performance information, instead of the predicted performance information. An example of the tendency in this case includes a slope of the line indicating the time change of the response time. It is desirable that the operation period is time of the next update of the performance information. The operation period may be designated by the user or may be determined in advance in the memory 2600. The predicted performance information may indicate performance information after the operation period from the measurement time of the performance information or may indicate performance information after the operation period from the calculation.

The trend information management program 2660 refers to the VM movement rule table 2690 and the page movement rule table 2780 to determine whether the calculated predicted performance information violates the data movement rule (S4503). More specifically, the trend information management program 2660 determines whether the predicted performance information satisfies the conditions defined in the data movement rule. Examples of the data movement caused by the data movement rule include VM movement caused by the VM movement rule and page movement caused by the page movement rule.

If the result of S4503 is No, the trend information management program 2660 returns the process to S4500. The trend information management program 2660 may wait for a predetermined standby time before executing the next S4500.

If the result of S4503 is Yes, the trend information management program 2660 notifies the data movement overall control program 2670 of the sign of the data movement (S4504) and ends the flow. The notification of the sign of the data movement includes: the configuration information of data (VM 1001 or page) determined to be moved after the operation period; the performance information; and the ID of the data movement rule (entry in the VM movement rule table 2690 or the page movement rule table 2780) violated by the predicted performance information.

As described, the trend information management program 2660 can calculate the performance trend which is the tendency of the measurement value of the performance information. Therefore, the trend information management program 2660 can predict the performance information of the future and can detect the sign of the data movement. Part of the process is different if the data movement of the VM by the VM movement control program is triggered by the reception of the user operation. In this case, if the trend information management program 2660 determines that the predicted performance information does not satisfy the conditions defined by the VM movement rule 2695, the trend information management program 2660 notifies the data movement overall control program 2670 that the performance needs to be improved because the predicted performance information does not satisfy the VM movement rule 2695, instead of the notification of the sign of the data movement in S4504. In the following description, the process of detecting (notifying, receiving) the sign can be replaced by the above notification. In the description of a movement cause identified by the data movement cause identification program 2680, the movement cause can be replaced by a performance reduction cause.

The data movement cause identification program 2680 will be described. Based on a movement cause identification request from the data movement overall control program 2670, the data movement cause identification program 2680 identifies a section causing the performance trend toward the data movement and sets the section as a movement cause. The movement cause identification request includes the configuration information of the target data, the ID of the target data movement rule, and the like. The performance trend is expressed by, for example, a slope of the time change of the performance information. The data movement cause identification program 2680 notifies the data movement overall control program 2670 of the identified movement cause. Examples of the movement cause include the hardware on the access path between the host computer 1000 and the storage apparatus 3000 and the performance information of the storage apparatus 3000 that satisfies the page movement rule.

The method of identifying the movement cause may be a method (RCA: Root Cause Analysis) of identifying the movement cause based on topology information of the network, such as the VM data configuration information table 2760 and the external storage configuration information table 2950, and based on event information, such as a performance degradation alert, as shown in Patent Literature 2 and 3, or may be a method of narrowing down the movement cause based on the topology information and a preset rule for identifying the cause. The identification method of the movement cause may be other methods, and the present invention is not limited to the identification method of the movement cause. The data movement cause identification program 2680 may execute the processes based on an instruction by the data movement overall control program 2670 or may execute the processes according to a user operation.

According to the data movement cause identification program 2680, the cause of data movement can be identified when a sign of the data movement is detected.

Processes of the data movement overall control program 2670 will be described. The data movement overall control program 2670 controls the data movement when a sign of data movement is received from the page movement control program 3330 or the trend information management program 2660. In the following description, the processes of the data movement overall control program 2670 will be divided into a process A including a process when a notification is received from the trend information management program 2660 and a process B including a process when a notification is received from the page movement control program 3330.

Figure 24:
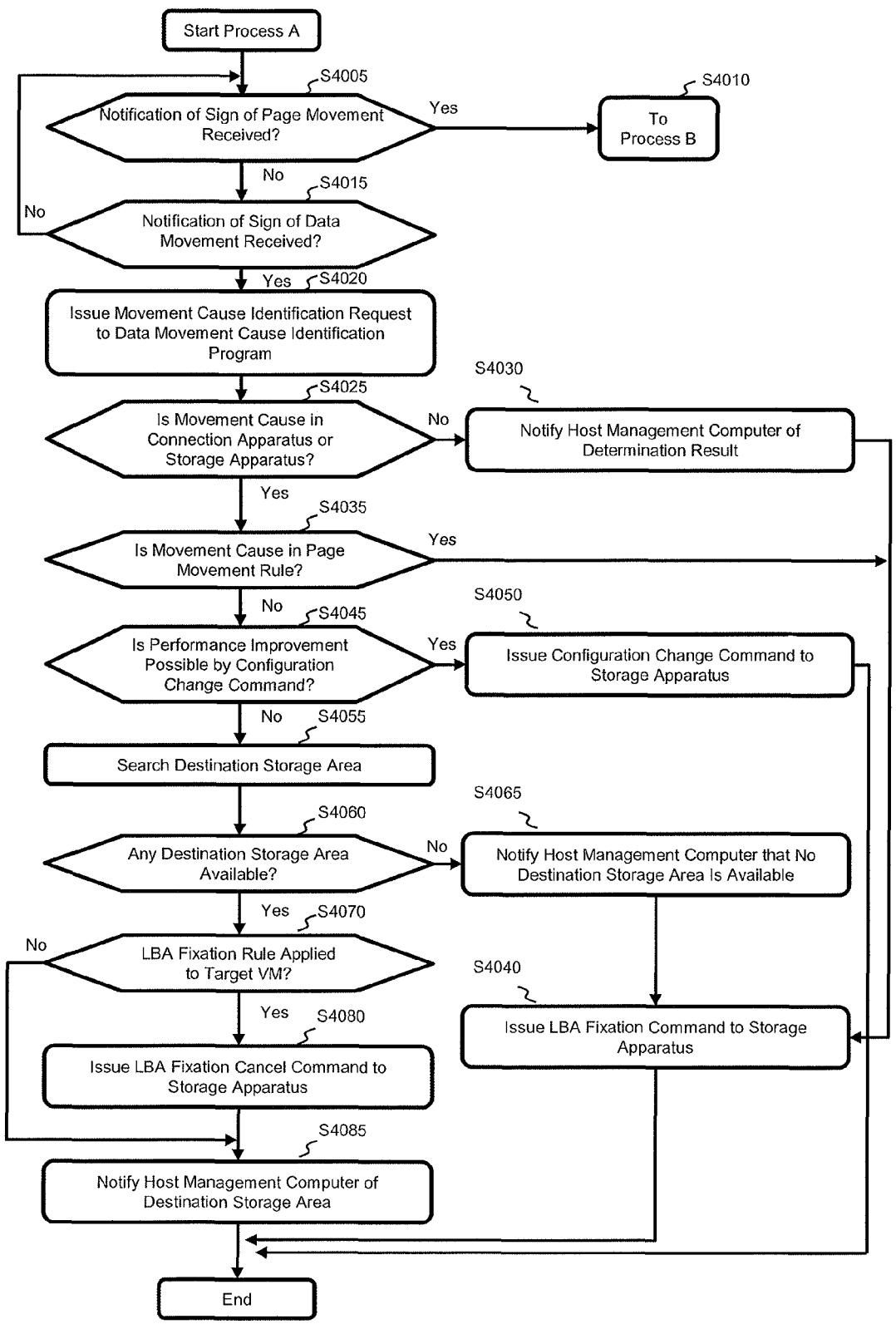
FIG. 24 is a flow chart showing a process A of a data movement overall control program according to the first embodiment.

FIG. 24 shows the process A of the data movement overall control program 2670. The data movement overall control program 2670 determines whether a notification indicating a sign of page movement is received from the page movement control program 3330 (S4005).

If the result of S4005 is Yes, the data movement overall control program 2670 executes the process B (S4010). Details of the process B will be described later. If the result of S4005 is No, the data movement overall control program 2670 determines whether a notification indicating a sign of data movement is received from the trend information management program 2660 (S4015).

If the result of S4015 is No, the data movement overall control program 2670 shifts the process to S4005 and waits again for the notification from the trend information management program 2660. If the result of S4015 is Yes, the data movement overall control program 2670 issues a movement cause identification request, which is for requesting the identification of the movement cause, to the data movement cause identification program 2680 to receive the movement cause identified by the data movement cause identification program 2680 (S4020). The movement cause identification request includes the ID of the data movement rule included in the notification of the sign of the data movement and the VM ID of the target VM 1001 of the data movement.

The data movement overall control program 2670 determines whether the received movement cause is one of the connection apparatus 500 and the storage apparatus 3000 (S4025). If the result of S4025 is No, the data movement overall control program 2670 notifies the host management computer 2000 of the determination result of the movement cause (S4030). For example, the determination result of the movement cause indicates that the cause is not one of the connection apparatus 500 and the storage apparatus 3000. The data movement overall control program 2670 refers to the VM data configuration information table 2760 to issue an LBA fixation command of the target VM 1001 to the page movement control program 3330 of the storage apparatus 3000 (S4040) and ends the flow. The LBA fixation command causes the page movement control program 3330 of the storage apparatus 3000 to configure the LBA fixation rule as the page movement rule. For example, as shown in the LBA fixation rule 2785 of the page movement rule table 2780, the LBA fixation rule is a rule for prohibiting the movement of the page that stores the data of the target VM 1001 and fixing the page to the LBA of the current resource.

As a result of S4030, the host computer 1000 or the host management computer 2000 executes a process according to the notification from the data movement overall control program 2670. In this way, the host computer 1000 or the host management computer 2000 does not perform the VM movement of the target VM 1001 between the logical volumes 3510 of the storage apparatus 3000 managed by the management computer 2500, even when the time indicated by the time interval 2694 of the VM movement rule table 2690 has passed.

If the result of S4025 is Yes, the data movement overall control program 2670 refers to the VM data configuration information table 2760, the page movement rule table 2780, the volume performance information table 2790, the volume physical logical storage area correspondence table 2800, the volume resource information table 2900, and the external storage configuration information table 2950 to determine whether the received movement cause is a page movement rule (S4035).

If the result of S4035 is Yes, the data movement overall control program 2670 shifts the process to S4040 and ends the flow. If the result of S4035 is No, the data movement overall control program 2670 determines whether the received movement cause can be solved by a configuration change (S4045). An example of the movement cause that can be solved by a configuration change is high load of the CPU 3110 of the storage apparatus 3000. In this case, the performance is improved by changing the configuration of the CPU 3110, which is allocated to the logical volume 3510 storing the target VM 1001, to another CPU 3110 with lower load. If, for example, the movement cause is a cache hit ratio of the memory 3300 of the storage apparatus 3000, the performance is improved by changing the configuration to increase the amount of the memory 3300 allocated to the logical volume storing the VM data.

If the result of S4045 is Yes, the data movement overall control program 2670 issues a configuration change command for improving the performance to the storage configuration program 3340 of the storage apparatus 3000 (S4050) and ends the flow.

If the result of S4045 is No, the data movement overall control program 2670 refers to the VM data configuration information table 2760, the volume physical logical storage area correspondence table 2800, and the external storage configuration information table 2950 to search for the logical volume 3510, for which the performance will be improved, to set a destination storage area (S4055). For example, the data movement overall control program 2670 detects, as the destination storage area, the logical volume 3510 that does not use the section identified as the movement cause or the logical volume 3510 that does not include the section identified as the movement cause in the access path from the VM 1001. The movement cause in this case is a section as a bottleneck of the performance in the storage apparatus 3000. An example of the section as the bottleneck is a section with high load (in a busy state). The data movement overall control program 2670 determines whether there is a destination storage area as a result of the search (S4060).

If the result of S4060 is No, the data movement overall control program 2670 notifies the host management computer 2000 that there is no destination storage area (S4065) and ends the flow after shifting the process to S4040.

As a result of S4065, the host computer 1000 or the host management computer 2000 executes a process according to the notification from the data movement overall control program 2670. In this way, the host computer 1000 or the host management computer 2000 does not perform the VM movement of the target VM 1001 between the logical volumes 3510 of the storage apparatus 3000 managed by the management computer 2500, even when the time indicated by the time interval 2694 of the VM movement rule table 2690 has passed.

If the result of S4060 is Yes, the data movement overall control program 2670 refers to the VM data configuration information table 2760, the page movement rule table 2780, and the volume performance information table 2790 to determine whether the LBA fixation rule is applied to the target VM 1001 (S4070).

If the result of S4070 is No, the data movement overall control program 2670 notifies the host management computer 2000 of the ID indicating the destination storage area in which the performance will be improved (S4085) and ends the flow. The ID indicating the destination storage area may be the ID of the logical volume 3510, the identifier of a file system (also called a data store) created by the HV 1002 from the logical volume 3510 for the management, and the like.

As a result of S4085, the host computer 1000 or the host management computer 2000 executes a process according to a notification from the data movement overall control program 2670. In this way, the host computer 1000 or the host management computer 2000 moves the VM 1001 to the storage area of the notified destination when the time indicated by the time interval 2694 of the VM movement rule table 2690 has passed.

If the result of S4070 is Yes, the data movement overall control program 2670 issues an LBA fixation cancel command to the page movement control program 3330 of the storage apparatus 3000 (S4080). The LBA fixation cancel command is a command for canceling the LBA fixation rule applied to the target VM 1001. The data movement overall control program 2670 shifts the process to S4085 and ends the flow.

The trigger for the management computer 2500 to notify the host management computer 2000 of the destination storage area is not limited to the notification from the trend information management program 2660 as in S4015. For example, the host management computer 2000 may inquire the management computer 2500 for the destination storage area before the VM movement. In this case, the host management computer 2000 may include a program for the inquiry. Alternatively, for example, the data movement overall control program 2670 may determine the destination storage area based on an instruction from the user. In this case, the management computer 2500 may include a user interface such as a button for determining the destination storage area.

According to the process A, the management computer 2500 notifies the host management computer 2000 of the destination storage area before the VM movement. Therefore, the host management computer 2000 can improve the performance after the VM movement.

According to the process A, the management computer 2500 can prevent the data movement when the sign of data movement is detected and when it is determined that the performance is not improved by the data movement.

Details of the process B (S4010) of the data movement overall control program 2670 when the result of S4005 is Yes will be described.

In the process B, the data movement overall control program 2670 that has received the sign of page movement performs control for preventing unnecessary VM movement caused by the page movement.

Figure 25:
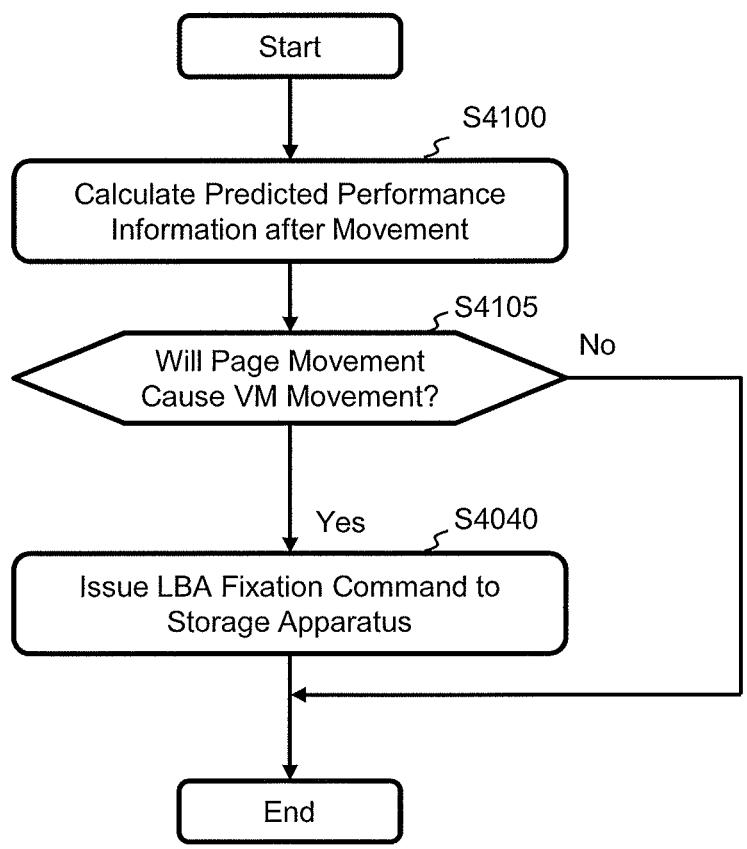
FIG. 25 is a flow chart showing a process B of the data movement overall control program according to the first embodiment.

FIG. 25 shows the process B of the data movement overall control program 2670. The data movement overall control program 2670 calculates the performance information after the target page movement based on the configuration information of the target page notified from the trend information management program 2660, the performance information of the page after the operation period from the present time, and the ID of the page movement rule determined to violate the rule after the operation period to calculate predicted performance information after movement (S4100). The data movement overall control program 2670 refers to the storage media catalog performance table 2730 and the page movement rule table 2780 to calculate the predicted performance information after movement. The data movement overall control program 2670 determines whether the result of the target page movement violates the VM movement rule of the VM 1001 that uses the target page based on the VM movement rule table 2690 and the predicted performance information after movement (S4105). Therefore, the data movement overall control program 2670 determines whether there is VM movement as a result of the target page movement.

If the result of S4105 is No, the data movement overall control program 2670 ends the flow. If the result of S4105 is Yes, the data movement overall control program 2670 shifts the process to S4040 and ends the flow. In the present embodiment, the page movement control program 3330 of the storage apparatus 3000 notifies the data movement overall control program of the sign of the page movement. The trend information management program 2660 of the management computer 2500 may manage the performance trend related to the page movement rule and notify the data movement overall control program 2670 of the sign when the sign of the page movement is detected. The present embodiment is not limited to the notification method of the sign of the page movement.

The processes of the data movement overall control program 2670 have been described.

According to the process B, the sign of the page movement can be detected to predict the VM movement caused by the page movement. In this way, the VM movement can be prevented.

A computer system excluding the function of the hierarchical storage management from the computer system of the present embodiment may be constructed to prevent the VM from being adversely affected by the page movement. Compared to the computer system without the hierarchical storage management, the computer system of the present embodiment can manage the hierarchical storage using a plurality of storage media with different performances to thereby improve the performance of the computer system while reducing the cost.

Second Embodiment

A second embodiment of the present invention will be described. Configurations different from the first embodiment will be particularly described in detail in the following description, and the same configurations as those of the first embodiment will not be described in detail. The first embodiment has illustrated that the VM information acquisition program 2610 of the management computer 2500 acquires the configuration information, the performance information, and the VM movement rule related to the VM 1001 from the host management computer 2000 and stores the configuration information, the performance information, and the VM movement rule in various tables. Meanwhile, the VM information acquisition program 2610 acquires the configuration information, the performance information, and the VM movement rule related to the VM 1001 from the host management computer 2000 in the present embodiment and further executes a process of monitoring the change in the VM movement rule and changing the page movement rule based on the change in the VM movement rule.

Figure 26:
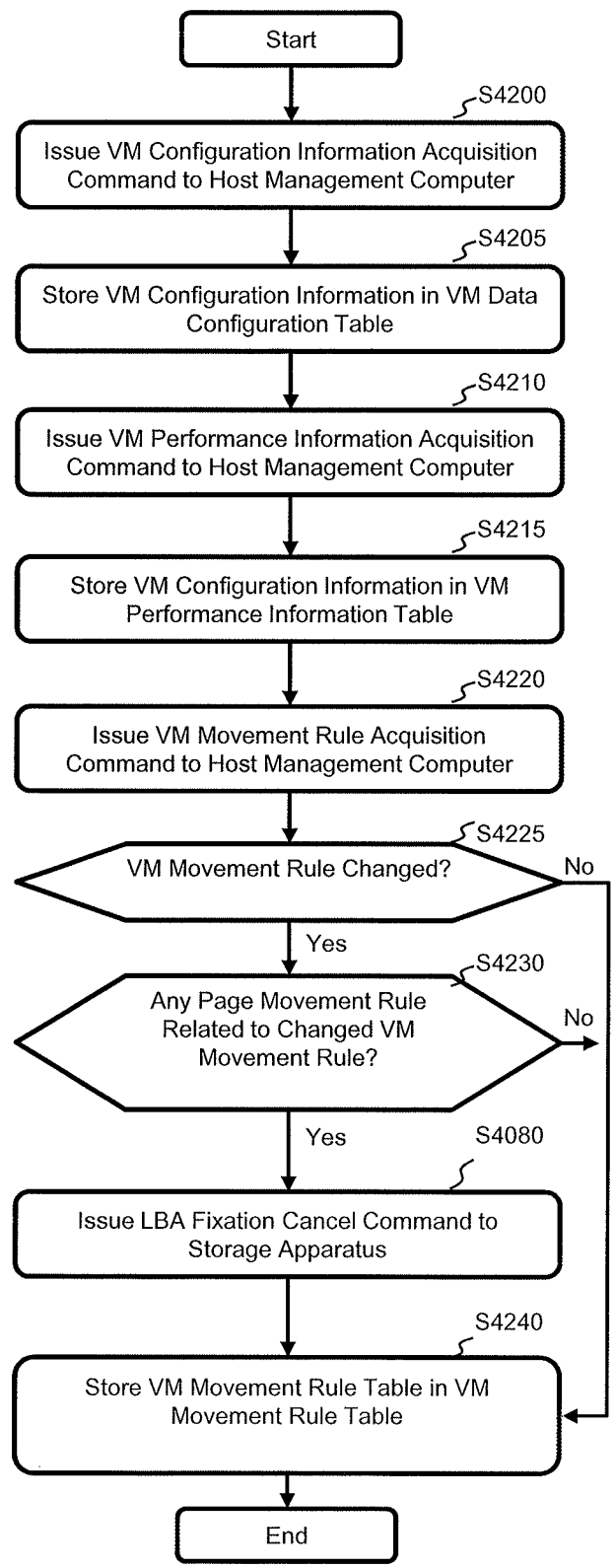
FIG. 26 is a flow chart showing a process of a VM information acquisition program according to a second embodiment of the present invention.

FIG. 26 shows a process of the VM information acquisition program 2610 according to the second embodiment. The VM information acquisition program 2610 may periodically execute the process or may apply the process to all VMs 1001.

The VM information acquisition program 2610 issues a VM configuration information acquisition command, which is for requesting the configuration information of the target VM 1001, to the VM configuration management program 2210 of the host management computer 2000 (S4200). The VM information acquisition program 2610 stores the configuration information acquired based on the VM configuration information acquisition command in the VM data configuration information table 2760 (S4205). The VM information acquisition program 2610 issues a VM performance information acquisition command, which is for requesting the performance information of the target VM 1001, to the VM performance management program 2220 of the host management computer 2000 (S4210). The VM information acquisition program 2610 stores the performance information acquired based on the VM performance information acquisition command in the VM performance information table 2700 (S4215). The VM information acquisition program 2610 issues a VM movement rule acquisition command, which is for requesting the VM movement rule of the target VM 1001, to the VM movement control program 2230 of the host management computer 2000 (S4220). The VM information acquisition program 2610 compares the information of the VM movement rule table 2690 with the VM movement rule acquired based on the VM movement rule acquisition command to determine whether the VM movement rule is changed (S4225).

If the result of S4225 is No, the VM information acquisition program 2610 stores the acquired VM movement rule in the VM movement rule table 2690 (S4240) and ends the flow. On the other hand, if the result of S4225 is Yes, the VM information acquisition program 2610 refers to the page movement rule table 2780 to determine whether there is a page movement rule related to the changed VM movement rule (S4230).

If the result of S4230 is No, the VM information acquisition program 2610 shifts the process to S4240 and ends the flow. On the other hand, if the result of S4230 is Yes, the VM information acquisition program 2610 issues an LBA fixation cancel command, which is for canceling the LBA fixation rule applied to the target VM 1001, to the page movement control program 3330 of the storage apparatus 3000 (S4080). In place of S4080, for example, the VM information acquisition program 2610 may issue a command for moving the page according to the change in the VM movement rule. For example, the command causes the target VM 1001 to move from a resource of SATA to a resource of SSD when the response time of the target VM 1001 in the VM movement rule is changed from 20 ms to 10 ms.

After S4080, the VM information acquisition program 2610 shifts the process to S4240 and ends the flow.

The process of the VM information acquisition program 2610 has been described.

Third Embodiment

A third embodiment of the present invention will be described. Configurations different from the first embodiment will be particularly described in detail, and the same configurations as those of the first embodiment will not be described in detail. In the illustration of S4055 of the first embodiment, the data movement overall control program 2670 of the management computer 2500 searches the destination in which the performance will be improved, when the cause of performance degradation is in the storage apparatus 3000. Meanwhile, in the present embodiment, the data movement overall control program 2670 receives a sign of data movement from the trend information management program 2660 and controls the data movement based on the cause of the data movement. In the present embodiment, a plurality of types of media with different performances are allocated to the plurality of logical volumes 3510, and a hierarchy is formed in the order of performance. For example, the media allocated to a plurality of ranks (tiers) are SSD, SAS, and SATA. When the cause of the VM movement is the performance of the medium allocated to the target VM 1001, the data movement overall control program 2670 particularly detects the allocation of an excessively high-performance resource allocated to another VM 1001 and moves the VM 1001 to a low-performance resource to allocate the high-performance medium to the target VM 1001.

Figure 27:
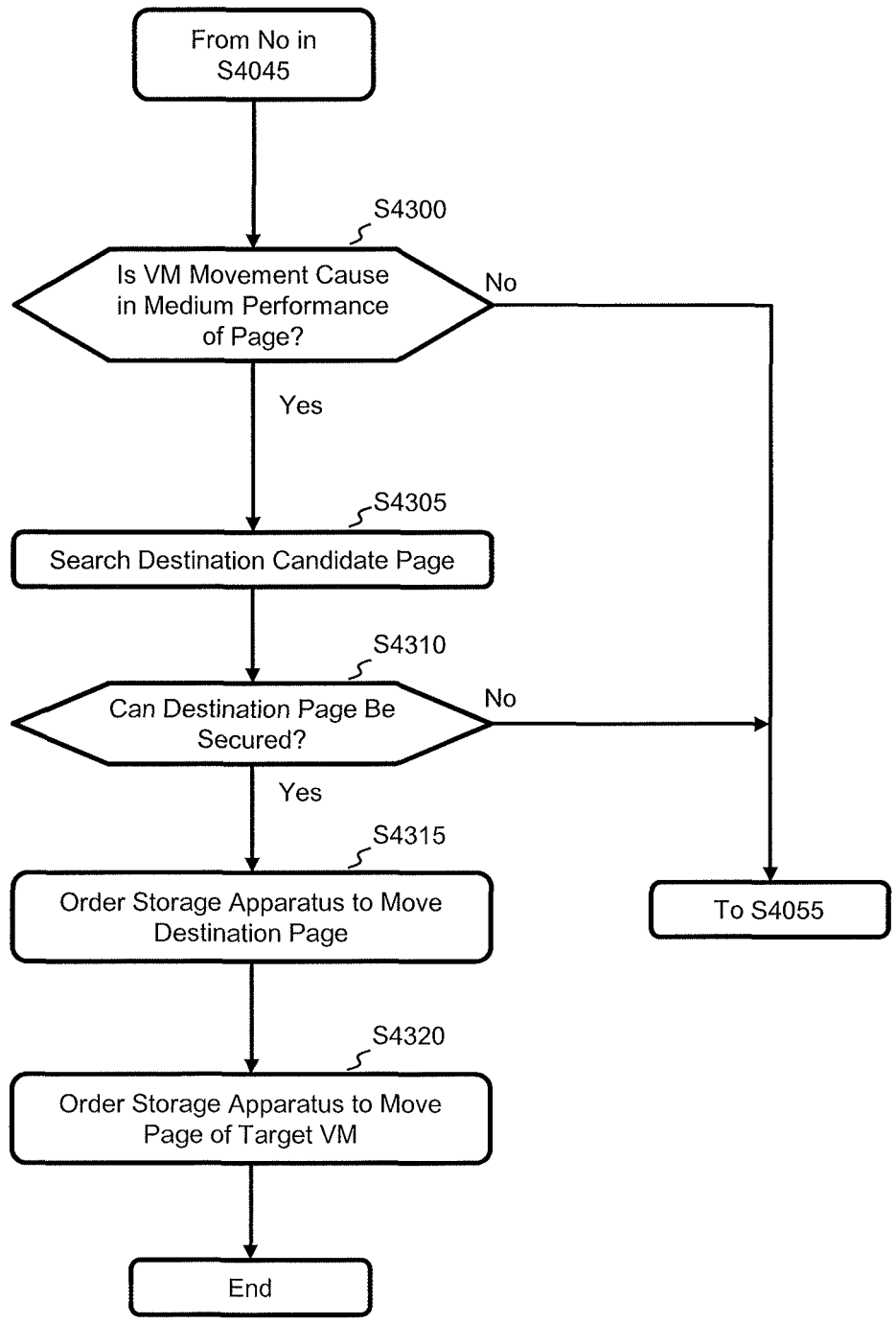
FIG. 27 is a flow chart showing a process of a data movement overall control program according to a third embodiment of the present invention.

FIG. 27 shows a process of the data movement overall control program 2670 according to the third embodiment. As in the first embodiment, the data movement overall control program 2670 executes the process up to S4045 shown in FIG. 24.

If the result of S4045 is Yes, the data movement overall control program 2670 executes the process following S4050 as in the first embodiment.

On the other hand, if the result of S4045 is No, the data movement overall control program 2670 determines whether the movement cause is the medium performance of the page allocated to the target VM 1001 (S4300).

If the result of S4300 is No, the data movement overall control program 2670 executes the process following S4055 as in the first embodiment. If the result of S4300 is Yes, the data movement overall control program 2670 searches for a destination candidate page as a page in which the data on the page can be moved to a medium with lower performance (S4305). For the search, the data movement overall control program 2670 refers to the VM movement rule table 2690, the VM performance information table 2700, the VM data configuration information table 2760, the page movement rule table 2780, the volume performance information table 2790, the volume physical logical storage area correspondence table 2800, and the volume resource information table 2900. The condition of the page obtained by the search is that the VM movement rule is not violated even if the VM 1001 on the page is moved to a medium with lower performance. In S4305, the destination candidate page may be detected from a resource if the resource is allocated to a VM 1001, the VM 1001 violates the VM movement rule, the VM movement rule is that the response time is below a predetermined threshold, the movement cause is not the performance of the medium of the resource, and the performance of the resource is not below the performance of the resource allocated to the target VM 1001.

The data movement overall control program 2670 uses a necessary number of destination pages among the destination candidate pages to determine whether the VM movement can be prevented (S4310). Therefore, the data movement overall control program 2670 determines whether the VM movement rule is not violated if the VM 1001 on the page as the movement cause is moved to the destination page.

If the result of S4310 is No, the process proceeds to S4055 shown in the first embodiment. If the result of S4310 is Yes, the data movement overall control program 2670 selects, from the search result of S4305, pages necessary for the target VM 1001 not to violate the VM movement rule. The data movement overall control program 2670 issues a command, which is for moving the selected page from the high-performance medium to the low-performance medium, to the page movement control program 3330 of the storage apparatus 3000 (S4315). The data movement overall control program 2670 issues a command, which is for moving the data of the VM 1001 on the page as the movement cause to the page of the original high-performance medium of S4315, to the page movement control program 3330 of the storage apparatus 3000 (S4320) and ends the process.

If the data of the VM 1001 is moved to the page of the high-performance medium according to the page movement rule just by executing S4315, and as a result, the movement cause is solved, the data movement overall control program 2670 may not execute S4320.

According to the present embodiment, a plurality of types of media with different performances can be used to improve the performance of the computer system.

Fourth Embodiment

A fourth embodiment of the present invention will be described. In the following description, configurations different from the first, second, and third embodiments will be particularly described in detail, and the same configurations as those of the first embodiment will not be described in detail. The first embodiment has illustrated that the index used in the VM movement rule is the response time. Meanwhile, the index used in the VM movement rule is a capacity utilization rate in the present embodiment.

FIG. 28 shows a VM movement rule table 2690B of the host management computer 2000 according to the fourth embodiment. Compared to the VM movement rule table 2690 illustrated in the first embodiment, the VM movement rule table 2690B of the present embodiment includes a VM movement rule 2695B in place of the VM movement rule 2695. The VM movement rule 2695B uses the capacity utilization rate as the index of the performance information of the VM 1001, such as by moving the VM 1001 indicated by the associated VM ID when the capacity utilization rate is below 80%.

FIG. 29 shows a VM performance information table 2700B of the host management computer 2000 according to the fourth embodiment. Compared to the VM performance information table 2700 illustrated in the first embodiment, the VM performance information table 2700B of the present embodiment newly includes an HV storage area ID 2706 as an ID of the storage area of the HV 1002 and a capacity utilization rate 2707 of the storage area of the HV 1002. The storage area of the HV 1002 is a storage area in the host computer 1000 that can be used by the HV 1002. In the present embodiment, the capacity utilization rate of the storage area of the HV 1002 is acquired from the host management computer 2000 or the host computer 1000. The capacity utilization rate may be in synchronization with a value of the capacity utilization rate of the logical volume 3510 that can be acquired from the storage apparatus 3000 described later or may not necessarily be in synchronization with the value.

Figures 30, 31:
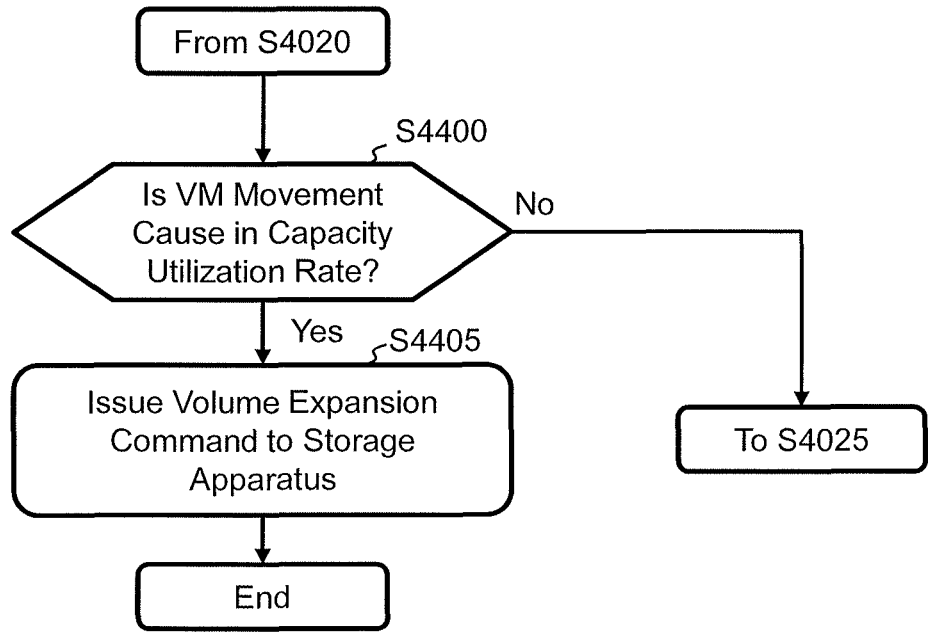
FIG. 30 shows an example of second VM data configuration information according to the fourth embodiment.
FIG. 31 is a flow chart showing a process of a data movement overall control program according to the fourth embodiment.

FIG. 30 shows second VM data configuration information 2760D in the VM data configuration information table 2760 of the host management computer 2000 according to the fourth embodiment. Compared to the VM data configuration information table 2760 of the first embodiment, the VM data configuration information table 2760 of the present embodiment includes the second VM data configuration information 2760D in place of the second VM data configuration information 2760B. Compared to the second VM data configuration information 2760B, the VM data configuration information 2760D newly includes an HV storage area ID 2775.

The VM information acquisition program 2610 of the present embodiment executes the following process in addition to the process of the VM information acquisition program 2610 of the first embodiment. The VM information acquisition program 2610 acquires, from the host management computer 2000, the ID of the storage area managed by the host management computer 2000 and stores the ID in the VM performance information table 2700B and the VM data configuration information table 2760. The VM information acquisition program 2610 acquires the capacity utilization rate of the storage area of the HV 1002 from the host management computer 2000 and stores the capacity utilization rate in the VM performance information table 2700B. The VM information acquisition program 2610 acquires the information of the VM movement rule related to the capacity utilization rate from the host management computer 2000 and stores the information in the VM movement rule table 2690B.

The trend information management program 2660 of the present embodiment executes the following process in addition to the process of the trend information management program 2660 of the first embodiment. The trend information management program 2660 monitors the capacity utilization rate held by the VM performance information table 2700B and determines whether the capacity utilization rate violates the VM movement rule in the VM movement rule table 2690B. If the capacity utilization rate violates the VM movement rule, the trend information management program 2660 notifies the data movement overall control program 2670 of the sign of the VM movement.

The data movement overall control program 2670 of the present embodiment executes a process of receiving the sign of the VM movement from the trend information management program 2660 and expanding the logical volume storing the data of the VM if the movement cause is the capacity utilization rule.

FIG. 31 shows an operation of the data movement overall control program 2670 according to the fourth embodiment. The data movement overall control program 2670 of the present embodiment executes the process up to S4020 as in the first embodiment. The data movement overall control program 2670 determines whether the movement cause is the capacity utilization rate (S4400). If the result of S4400 is No, the data movement overall control program 2670 shifts the process to S4025. If the result of S4400 is Yes, the data movement overall control program 2670 issues a volume expansion command to the storage configuration program 3340 of the storage apparatus 3300 (S4405) and ends the flow. In the present embodiment, the flow is finished even if the volume expansion is not possible as a result of the volume expansion command. The management computer 2500 may acquire in advance the information related to the possibility of the volume expansion from the storage apparatus 3000, and the data movement overall control program 2670 may determine whether to issue the volume expansion command based on the volume expansion possibility information.

As a result of the operation of the data movement overall control program 2670, the HV 1002 can recognize the capacity of the logical volume 3510 again by, for example, rescanning the logical volume 3510, when the capacity of the logical volume 3510 is expanded.

Fifth Embodiment

A fifth embodiment of the present invention will be described. In the following description, configurations different from the first embodiment will be particularly described in detail, and the same configurations as those of the first embodiment will not be described in detail. In S4055 of the first embodiment, it is illustrated that the data movement overall control program 2670 of the management computer 2500 searches the destination in which the performance will be improved, when the cause of the performance degradation is in the storage apparatus 3000. Meanwhile, the data movement overall control program 2670 narrows down the destination storage area in the present embodiment.

Figure 32:
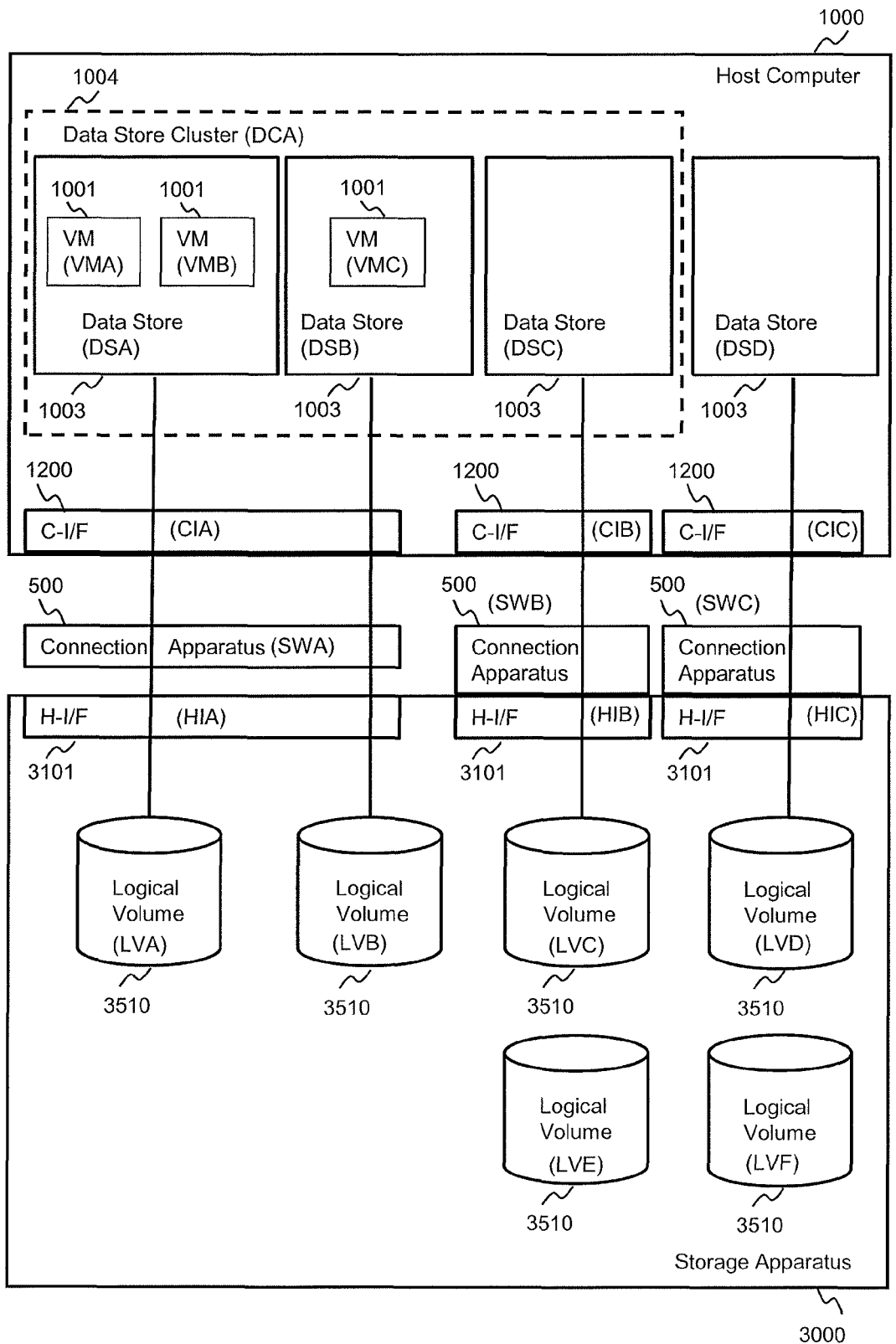
FIG. 32 shows a specific example of a state before VM movement according to a fifth embodiment.

An operation of the data movement overall control program 2670 of the present embodiment will be described using a specific example of a state before the VM movement. FIG. 32 shows a specific example of a state before the VM movement according to the fifth embodiment. In the present embodiment, the HV 1002 uses the logical volumes 3510 to create data stores 1003 and creates a data store cluster 1004 as a group of some of the data stores 1003. The VM data configuration information table 2760 includes information associating the VMs 1001, the data stores 1003, and the data store cluster 1004 and indicating whether the target logical volume is mounted on the host computer 1000. In the example, six logical volumes 3510 are created in the storage apparatus 3000. In the drawings and the following description, the logical volumes 3510 will be called an LVA, an LVB, an LVC, an LVD, an LVE, and an LVF. Among the logical volumes 3510, the LVA, the LVB, the LVC, and the LVD are mounted on the host computer 1000.

Four data stores 1003 are created in the host computer 1000. In the drawings and the following description, the data stores 1003 will be called a DSA, a DSB, a DSC, and a DSD. The data store cluster 1004 is created in the host computer 1000 in the drawings and the following description. The data store cluster 1004 will be called a DCA. The constituent elements of the DCA are the DSA, the DSB, and the DSC. Three VMs 1001 are created in the host computer 1000. In the drawings and the following description, the VMs 1001 will be called a VMA, a VMB, and a VMC. The VMA and the VMB are stored in the DSA. The VMC is stored in the DSB.

Three C-I/Fs 1200 are used in the paths of access from the host computer 1000 to the storage apparatus 3000. In the drawings and the following description, the C-I/Fs 1200 will be called a CIA, a CIB, and a CIC. Three connection apparatuses 500 are used in the paths of access from the host computer 1000 to the storage apparatus 3000. In the drawings and the following description, the connection apparatuses will be called an SWA, an SWB, and an SWC. Three H-I/Fs 3101 are used in the paths of access from the host computer 1000 to the storage apparatus 3000. In the drawings and the following description, the H-I/Fs 3101 will be called an HIA, an HIB, and an HIC.

The DSA, the DSB, the DSC, and the DSD are created using the LVA, the LVB, the LVC, and the LVD, respectively. Each of the access path from the host computer 1000 to the LVA and the access path from the host computer 1000 to the LVB includes the CIA, the SWA, and the HIA. The access path from the host computer 1000 to the LVC includes the CIB, the SWB, and the HIB. The access path from the host computer 1000 to the LVD includes the CIC, the SWC, and the HIC.

It is assumed that the sign of the VM movement of the VMA is detected in this state, and the movement cause is part of the access path including the CIA, the SWA, and the HIA, such as high load of the CIA.

Figure 33:
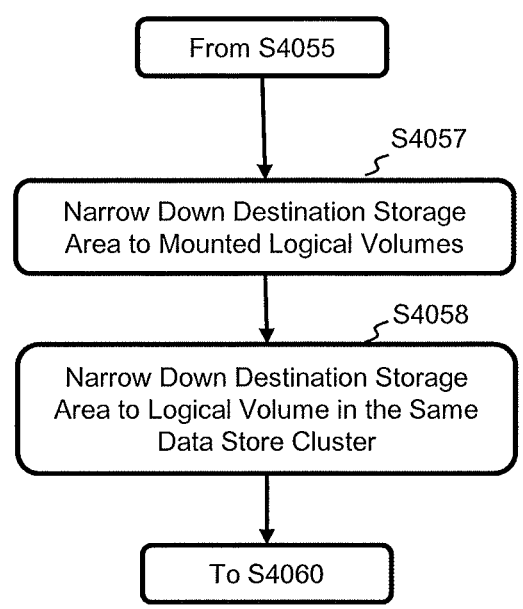
FIG. 33 is a flow chart showing an operation of a data movement overall control program 2670 according to the fifth embodiment.

FIG. 33 shows an operation of the data movement overall control program 2670 according to the fifth embodiment. The data movement overall control program 2670 of the present embodiment executes the process up to S4055 as in the first embodiment. In this way, the data movement overall control program 2670 detects, as the destination storage areas, the logical volumes 3510 not using the section identified as the movement cause. Using the specific example to describe, the data movement overall control program 2670 detects the LVC, the LVD, the LVE, and the LVF, which are the logical volumes 3510 without the movement cause in the access path, as the destination storage areas in S4055. Therefore, the LVB that shares the access path of the CIA, the SWA, and the HIA with the LVA is excluded from the destination storage areas.

The data movement overall control program 2670 selects the logical volumes 3510 mounted on the host computer 1000 among the destination storage areas to set new destination storage areas (S4057). The data movement overall control program 2670 refers to the VM data configuration information table 2760. Using the specific example to describe, the data movement overall control program 2670 narrows down the destination storage areas to the LVC and the LVD that are the logical volumes 3510 already mounted on the host computer 1000 in S4057. Therefore, the LVE and the LVF not mounted on the host computer 1000 are excluded from the destination storage areas.

The data movement overall control program 2670 selects the logical volume 3510 corresponding to the data store 1003 belonging to the same data store cluster 1004 among the destination storage areas to set a new destination storage area (S4058). The data movement overall control program 2670 refers to the VM data configuration information table 2760. Using the specific example to describe, the data movement overall control program 2670 recognizes, in S4058, the DCA that is the data store cluster 1004 to which the DSA storing the VMA belongs and narrows down the destination storage area to the LVC corresponding to the DSC that is the data store 1003 belonging to the DCA. Therefore, the LVD not belonging to the same data store cluster 1004 as the DSA is excluded from the destination storage areas. The data movement overall control program 2670 notifies the host management computer 2000 of the DSC in S4085.

The data movement overall control program 2670 executes the process following S4060 as in the first embodiment.

When the destination storage area is not notified by the management computer 2500 at the VM movement or when a plurality of destination storage areas are notified, the host management computer 2000 or the host computer 1000 may select, as the data store 1003 of the destination, the data store 1003 with the smallest number of stored VMs 1001 among the data stores 1003 that can be used as the destination storage areas or may take into account the rules used when the host management computer determines the data store 1003 of the destination. An example of the rules used when the host management computer determines the data store 1003 of the destination includes affinity rules illustrated in p. 6 of Non Patent Literature 1. The management computer may acquire the rules from the host management computer to select the data store 1003 of the destination according to the rules.

According to the present embodiment, the accuracy of the selection of the destination storage area reported to the host management computer 2000 can be improved.

Other Embodiments

In the embodiments, the CPU 2510 of the management computer 2500 realizes various functions of the trend information management program 2660, the data movement overall control program 2670, and the like based on various programs stored in the management computer 2500. However, the present invention is not limited to the embodiments. For example, the CPU 2510 may be arranged on another apparatus separate from the management computer 2500 to realize various functions in collaboration with the CPU 2510. Various programs stored in the management computer 2500 may be arranged on another apparatus separate from the management computer 2500, and the CPU 2510 may invoke the programs to realize various functions.

Furthermore, for example, the steps in the processes by the management computer 2500 and the like of the present specification may not necessarily be chronologically processed in the orders described in the flow charts. Therefore, the steps in the processes by the management computer 2500 and the like may be different processes or may be executed in parallel.

Computer programs for causing the hardware, such as the CPU and the memory included in the management computer 2500 and the like, to attain similar functions as those of the configurations, such as the management computer 2500, can also be created. A storage medium storing the computer programs is also provided.

According to the embodiments, the computer system can use both the storage apparatuses 3000 that perform the hierarchical storage management and the host computers 1000 that control the VM movement. The user can have the advantageous effects of the hierarchical storage management by the storage apparatuses 3000 and the advantageous effects of the VM movement by the host computers 1000.

The embodiments can also be applied even if objects such as other programs and data are used in place of the VMs 1001. The host computers 1000 control the objects, and the objects move between a plurality of logical volumes 3510.

The present invention is not limited to the embodiments. Those skilled in the art can make various additions and changes within the scope of the present invention.

The technique described above can be expressed as follows.

(Expression 1)

A management computer connected to a computer and a storage apparatus, the management computer comprising:
  a memory configured to store first configuration information indicating a plurality of logical storage areas provided by the storage apparatus and a first condition defining a state of the storage apparatus as a trigger for the storage apparatus to move data in one of the plurality of logical storage areas to another one of the plurality of logical storage areas;
  a CPU connected to the memory; and
  a network interface for communication between the computer and the storage apparatus, wherein
  the CPU is configured to
  acquire a second condition defining a state of the computer as a trigger for the computer to move a first object, which is stored in a first logical storage area among the plurality of logical storage areas and performed by the computer, to another one of the plurality of logical storage areas,
  acquire second configuration information associating the first object and the first logical storage area,
  acquire, from the storage apparatus, first state information indicating a state of the plurality of logical storage areas,
  acquire, from the computer, second state information indicating a state of the first object,
  determine whether a state of performing data movement from the first logical storage area to another logical storage area is set based on the first condition, the second condition, the first state information, and the second state information, and
  identify a cause of the state of performing the data movement based on the first configuration information and the second configuration information to control the data movement based on the cause if the state of performing the data movement is set, and
  the plurality of logical storage areas use respectively a plurality of storage media with different performances.

(Expression 2)

A storage system comprising:
  a storage apparatus accessed by a computer; and
  a management computer connected to the computer and the storage apparatus, wherein
  the storage apparatus is configured to provide a plurality of logical storage areas, and when a state of the storage apparatus satisfies a first condition, the storage apparatus is configured to move data in one of the plurality of logical storage areas to another one of the plurality of logical storage areas when a state of the storage apparatus satisfies a first condition,
  the management computer comprises:
  a memory configured to store first configuration information, which indicates the plurality of logical storage areas, and the first condition;
  a CPU connected to the memory; and
  a network interface for communication between the computer and the storage apparatus, the CPU is configured to
acquire a second condition defining a state of the computer as a trigger for the computer to move a first object, which is stored in a first logical storage area among the plurality of logical storage areas and performed by the computer, to another one of the plurality of logical storage areas,
acquire second configuration information associating the first object and the first logical storage area,
acquire, from the storage apparatus, first state information indicating a state of the plurality of logical storage areas,
acquire, from the computer, second state information indicating a state of the first object,
determine whether a state of performing data movement from the first logical storage area to another logical storage area is set based on the first condition, the second condition, the first state information, and the second state information, and
identify a cause of the state of performing the data movement based on the first configuration information and the second configuration information to control the data movement based on the cause if the state of performing the data movement is set, and
the plurality of logical storage areas respectively use a plurality of storage media with different performances.

In the expressions, the first configuration information corresponds to, for example, the volume physical logical storage area correspondence table 2800, the volume resource information table 2900, and the external storage configuration information table 2950. The second configuration information corresponds to, for example, the VM data configuration information table 2760. The first condition corresponds to, for example, the page movement rule table 2780. The second condition corresponds to, for example, the VM movement rule table 2690. The logical storage area corresponds to, for example, the logical volume 3510. The network interface corresponds to, for example, the I/F 2505. The case in which the state of performing the data movement from the first logical storage area to the other logical storage area is set corresponds to, for example, the case in which the sign of the data movement is detected and the case in which the data movement is performed in response to the user operation is received.

REFERENCE SIGNS LIST

500: connection apparatus, 1000: host computer, 1001: VM (Virtual Machine), 1002: HV (Hypervisor), 1500: data network, 1550: management network, 2000: host management computer, 2210: VM configuration management program, 2220: VM performance management program, 2230: VM movement control program, 2500: management computer, 2610: VM information acquisition program, 2630: storage information acquisition program, 2650: connection apparatus information acquisition program, 2660: trend information management program, 2670: data movement overall control program, 2680: data movement cause identification program, 2690: VM movement rule table, 2700: VM performance information table, 2710: storage port catalog performance information table, 2720: storage port performance measurement value table, 2730: storage media catalog performance table, 2740: connection apparatus catalog performance table, 2750: connection apparatus performance measurement value table, 2760: VM data configuration information table, 2780: page movement rule table, 2790: volume performance information table, 2800: volume physical logical storage area correspondence table, 2900: volume resource information table, 2950: external storage configuration information table, 3000: storage apparatus, 3510: logical volume

The invention claimed is:

1. A management computer coupled to a computer and a storage apparatus, the management computer comprising:
   a memory storing a first configuration information indicating a plurality of logical storage areas provided by the storage apparatus, and a first condition defining a state of the storage apparatus as a trigger for the storage apparatus to move data in one of the plurality of logical storage areas to another one of the plurality of logical storage areas; and
   a CPU being configured to:
   acquire a second condition defining a state of the storage apparatus as a trigger for the computer to move a first object which is performed by the computer;
   acquire a second configuration information associating the first object and the first logical storage area;
   acquire, from the storage apparatus, a first state information indicating a state of the plurality of logical storage areas;
   acquire, from the computer, a second state information indicating a state of the first object;
   determine whether a state of performing data movement from the first logical storage area to another logical storage area is set based on the first condition, the second condition, the first state information, and the second state information;
   if the state of performing the data movement is set, identify a cause of the state of performing the data movement based on the first configuration information and the second configuration information; and
   control the data movement based on the cause.

2. The management computer according to claim 1, wherein the state of the storage apparatus of the second condition is a performance of the logical storage area of the storage apparatus.

3. The management computer according to claim 2, wherein the first object is a virtual machine.

4. The management computer according to claim 3, wherein the plurality of logical storage areas respectively use a plurality of storage media with different performances.

5. The management computer according to claim 3, wherein the CPU furthermore being configured to:
   predict the first state information after the acquired first state information based on the acquired first state information;
   predict the second state information after the acquired second state information based on the acquired second state information; and
   determine that the state of performing the data movement is set if the predicted first state information satisfies the first condition or if the predicted second state information satisfies the second condition.

6. The management computer according to claim 3, wherein if the cause is in an access path between the computer and the storage apparatus, the CPU is furthermore configured to prohibit the data movement by a configuration of the first condition.

7. The management computer according to claim 3, wherein if the cause is not in the access path between the computer and the storage apparatus, the CPU is furthermore configured to search, as a destination of the data movement, a logical storage area that uses an access path avoiding the cause among the plurality of logical storage areas.

8. The management computer according to claim 7,
wherein the result of the data movement destination is transmitted to the computer.

9. The management computer according to claim 7,
wherein if the destination is not detected by the search, the CPU is furthermore configured to prohibit the data movement by the configuration of the first condition.

10. The management computer according to claim 9,
wherein if the destination is detected by the search and the data movement is prohibited by the configuration of the first condition, the prohibition of the data movement is canceled by the configuration of the first condition.

11. The management computer according to claim 3,
wherein if the cause is the performance of the storage medium corresponding to the first logical storage area, the CPU is furthermore configured to predict a second state information of a second object stored in a second logical storage area among the plurality of logical storage areas when the second object is moved to a third logical storage area among the plurality of logical storage areas, if the predicted second state information of the second object does not satisfy the second condition, the CPU is furthermore configured to move the data in the second logical storage area to the third logical storage area and to move the data in the first logical storage area to the second logical storage area, and the performance of a first storage medium corresponding to the first logical storage area among the plurality of storage media is lower than the performance of a second storage medium corresponding to the second logical storage area among the plurality of storage media.

12. The management computer according to claim 3,
wherein the CPU is furthermore configured to continuously acquire the second condition to monitor changes in the second condition, and if the CPU detects a change in the second condition, the CPU is furthermore configured to change the first condition based on the detected change.

13. The management computer according to claim 3,
wherein the first condition is defined by the number of IO requests to the logical storage area.

14. A management method of a computer and a storage apparatus, the management method comprising:
storing a first configuration information indicating a plurality of logical storage areas provided by the storage apparatus, and a first condition defining a state of the storage apparatus as a trigger for the storage apparatus to move data in one of the plurality of logical storage areas to another one of the plurality of logical storage areas;
acquiring a second condition defining a state of the storage apparatus as a trigger for the computer to move a first object which is performed by the computer;
acquiring a second configuration information associating the first object and the first logical storage area;
acquiring a first state information indicating a state of the plurality of logical storage areas;
acquiring a second state information indicating a state of the first object;
determining whether a state of performing data movement from the first logical storage area to another logical storage area is set based on the first condition, the second condition, the first state information, and the second state information;
if the state of performing the data movement is set, identifying a cause of the state of performing the data movement based on the first configuration information and the second configuration information; and
controlling the data movement based on the cause.

\* \* \* \* \*